(12) United States Patent
Barker et al.

(10) Patent No.: US 7,627,665 B2
(45) Date of Patent: Dec. 1, 2009

(54) SYSTEM AND METHOD FOR PROVIDING CONFIGURABLE SECURITY MONITORING UTILIZING AN INTEGRATED INFORMATION SYSTEM

(76) Inventors: Geoffrey T. Barker, 10034 NE. Knight Rd., Bainbridge Island, WA (US) 98110; Claire Andersen, 2712 NE. 62nd St., Seattle, WA (US) 98115; Bruce Alexander, 13630 S. Keyport Rd. NE., Poulsbo, WA (US) 98370; Liem Bahneman, 15764 - 111th Ave. NE., Bothell, WA (US) 98011

( * ) Notice: Subject to any disclaimer, the term of this patent is extended or adjusted under 35 U.S.C. 154(b) by 272 days.

(21) Appl. No.: 09/825,506

(22) Filed: Apr. 3, 2001

(65) Prior Publication Data

US 2002/0143934 A1 Oct. 3, 2002

Related U.S. Application Data

(60) Provisional application No. 60/236,282, filed on Sep. 28, 2000.

(51) Int. Cl.
*G06F 15/173* (2006.01)
(52) U.S. Cl. ..................................................... 709/224
(58) Field of Classification Search ......... 709/223–229, 709/217–219; 340/504–519, 540–567; 713/200; 707/200; 348/148–153; 702/188; 715/736
See application file for complete search history.

(56) References Cited

U.S. PATENT DOCUMENTS

| | | |
|---|---|---|
| 3,757,039 A | 9/1973 | Brewer |
| 4,216,375 A | 8/1980 | Ulch et al. |
| 4,218,690 A | 8/1980 | Ulch et al. |
| 4,581,634 A | 4/1986 | Williams |
| 4,714,995 A | 12/1987 | Materna et al. |

(Continued)

FOREIGN PATENT DOCUMENTS

EP   0 804 031 A2   10/1997

(Continued)

OTHER PUBLICATIONS

Muller, N: Focus on Openview: A Guide to Hewlett-Packard's Network and Systems Management Platforms; © 1995, CBM books, pp. 123-133.*

(Continued)

*Primary Examiner*—Benjamin R Bruckart
(74) *Attorney, Agent, or Firm*—Christensen O'Connor Johnson Kindness PLLC

(57) ABSTRACT

A system and method for implementing an integrated information system are provided. A premises server is in communication with a variety of information sources that produce monitoring data for a premises. The premises server collects, presents, and transmits the monitoring device data to a central server capable of processing data from multiple premises servers. The central server receives the data and traverses one or more logical rule sets to determine whether the inputted data violates the rules. Based on an evaluation of the rules, the central server generates outputs in the form of communication to one or more authorized users via a variety of communication mediums and devices and/or the instigation of a variety of acts corresponding to the evaluation of the rules.

53 Claims, 11 Drawing Sheets

U.S. PATENT DOCUMENTS

| | | | |
|---|---|---|---|
| 4,721,954 A | 1/1988 | Mauch | |
| 4,816,658 A | 3/1989 | Khandwala et al. | |
| 4,837,568 A | 6/1989 | Snaper | |
| 4,839,640 A | 6/1989 | Ozer et al. | |
| 4,962,473 A | 10/1990 | Crain | |
| 4,998,279 A | 3/1991 | Weiss | |
| 5,086,385 A | 2/1992 | Launey | |
| 5,097,505 A | 3/1992 | Weiss | |
| 5,204,670 A | 4/1993 | Stinton | |
| 5,210,873 A | 5/1993 | Gay et al. | |
| 5,367,624 A | 11/1994 | Cooper | |
| 5,465,358 A | 11/1995 | Blades | |
| 5,475,375 A | 12/1995 | Barrett et al. | |
| 5,475,378 A | 12/1995 | Kaarsoo et al. | |
| 5,491,511 A | 2/1996 | Odle | |
| 5,499,356 A | 3/1996 | Eckert | |
| 5,506,986 A | 4/1996 | Healy | |
| 5,541,911 A | 7/1996 | Nilakantan | |
| 5,544,062 A | 8/1996 | Johnston, Jr. | |
| RE35,336 E | 9/1996 | Ulch et al. | |
| 5,600,368 A | 2/1997 | Matthews, III | |
| 5,614,890 A | 3/1997 | Fox | |
| 5,619,183 A | 4/1997 | Ziegra | |
| 5,629,981 A | 5/1997 | Nerlikar | |
| 5,654,696 A | 8/1997 | Barrett et al. | |
| 5,664,186 A | 9/1997 | Bennett | |
| 5,675,738 A | 10/1997 | Suzuki | |
| 5,678,039 A | 10/1997 | Hinks | |
| 5,680,328 A | 10/1997 | Skorupski et al. | |
| 5,682,142 A | 10/1997 | Loosmore et al. | |
| 5,717,379 A | 2/1998 | Peters | |
| 5,729,471 A | 3/1998 | Jain | |
| 5,732,232 A | 3/1998 | Brush, II | |
| 5,742,286 A | 4/1998 | Kung | |
| 5,758,340 A | 5/1998 | Nail | |
| 5,768,119 A | 6/1998 | Havekost et al. | |
| 5,771,354 A | 6/1998 | Crawford | |
| 5,810,747 A | 9/1998 | Brudny | |
| 5,813,009 A | 9/1998 | Johnson | |
| 5,821,855 A | 10/1998 | Lewis | |
| 5,828,848 A | 10/1998 | MacCormack | |
| 5,838,368 A | 11/1998 | Masunaga | |
| 5,838,682 A | 11/1998 | Dekelbaum | |
| 5,844,501 A | 12/1998 | El-Ibiary | |
| 5,848,143 A | 12/1998 | Andrews | |
| 5,870,733 A | 2/1999 | Bass et al. | |
| 5,872,594 A | 2/1999 | Thompson | |
| 5,879,163 A | 3/1999 | Brown | |
| 5,903,455 A | 5/1999 | Sharpe, Jr. | |
| 5,903,730 A | 5/1999 | Asai | |
| 5,905,436 A * | 5/1999 | Dwight et al. | 340/573.1 |
| 5,917,405 A | 6/1999 | Joao | |
| 5,923,264 A | 7/1999 | Lavelle et al. | |
| 5,937,415 A | 8/1999 | Sheffield | |
| 5,943,673 A * | 8/1999 | Felouzis et al. | 707/104.1 |
| 5,960,174 A | 9/1999 | Dew | |
| 5,963,131 A | 10/1999 | D'Angelo | |
| 5,982,362 A | 11/1999 | Crater | |
| 5,987,519 A | 11/1999 | Peifer | |
| 5,990,885 A | 11/1999 | Gopinath | |
| 6,002,994 A * | 12/1999 | Lane et al. | 702/188 |
| 6,011,547 A | 1/2000 | Shiota | |
| 6,012,100 A | 1/2000 | Frailong | |
| 6,023,223 A * | 2/2000 | Baxter, Jr. | 340/531 |
| 6,031,455 A | 2/2000 | Grube | |
| 6,041,347 A * | 3/2000 | Harsham et al. | 709/220 |
| 6,064,316 A * | 5/2000 | Glick et al. | 340/5.65 |
| 6,064,723 A | 5/2000 | Cohn et al. | |
| 6,070,228 A | 5/2000 | Belknap | |
| 6,075,553 A | 6/2000 | Freeman | |
| 6,076,111 A | 6/2000 | Chiu | |
| 6,085,227 A | 7/2000 | Edlund | |
| 6,091,771 A | 7/2000 | Seeley | |
| 6,115,040 A | 9/2000 | Bladow | |
| 6,133,941 A | 10/2000 | Ono | |
| 6,157,935 A | 12/2000 | Tran | |
| 6,157,956 A | 12/2000 | Jensen | |
| 6,166,729 A | 12/2000 | Acosta | |
| 6,167,358 A * | 12/2000 | Othmer et al. | 702/188 |
| 6,182,142 B1 | 1/2001 | Win | |
| 6,185,316 B1 | 2/2001 | Buffam | |
| 6,188,973 B1 * | 2/2001 | Martinez et al. | 702/188 |
| 6,219,439 B1 * | 4/2001 | Burger | 382/115 |
| 6,226,031 B1 | 5/2001 | Barraclough | |
| 6,229,429 B1 * | 5/2001 | Horon | 340/286.01 |
| 6,233,588 B1 * | 5/2001 | Marchoili et al. | 707/200 |
| 6,239,833 B1 | 5/2001 | Ozaki | |
| 6,243,129 B1 | 6/2001 | Deierling | |
| 6,250,452 B1 | 6/2001 | Partyka | |
| 6,271,752 B1 | 8/2001 | Vaios | |
| 6,271,805 B1 | 8/2001 | Yonezawa | |
| 6,281,790 B1 * | 8/2001 | Kimmel et al. | 340/506 |
| 6,289,380 B1 | 9/2001 | Battat | |
| 6,297,746 B1 * | 10/2001 | Nakazawa et al. | 340/825.69 |
| 6,298,474 B1 | 10/2001 | Blowers | |
| 6,304,857 B1 | 10/2001 | Heindel | |
| 6,308,205 B1 | 10/2001 | Carcerano | |
| 6,311,210 B1 | 10/2001 | Foladare | |
| 6,324,647 B1 | 11/2001 | Bowman-Amuah | |
| 6,356,949 B1 | 3/2002 | Katsandres | |
| 6,362,836 B1 | 3/2002 | Shaw | |
| 6,366,686 B1 | 4/2002 | Schroeder | |
| 6,369,695 B1 | 4/2002 | Horon | |
| 6,393,387 B1 * | 5/2002 | Adriaans et al. | 703/27 |
| 6,412,359 B1 | 7/2002 | Zborowski | |
| 6,429,893 B1 * | 8/2002 | Xin | 348/155 |
| 6,430,712 B2 | 8/2002 | Lewis | |
| 6,430,740 B1 | 8/2002 | Hart | |
| 6,446,200 B1 * | 9/2002 | Ball et al. | 713/1 |
| 6,460,141 B1 | 10/2002 | Olden | |
| 6,483,878 B1 | 11/2002 | Yonezawa | |
| 6,498,987 B1 * | 12/2002 | Kelly et al. | 702/3 |
| 6,499,054 B1 | 12/2002 | Hesselink | |
| 6,504,479 B1 | 1/2003 | Lemons | |
| 6,519,540 B1 | 2/2003 | Salandro | |
| 6,529,475 B1 * | 3/2003 | Wan et al. | 370/231 |
| 6,529,936 B1 | 3/2003 | Mayo | |
| 6,542,075 B2 * | 4/2003 | Barker et al. | 340/506 |
| 6,553,336 B1 | 4/2003 | Johnson | |
| 6,560,557 B1 | 5/2003 | Carnahan | |
| 6,564,380 B1 | 5/2003 | Murphy | |
| 6,567,536 B2 | 5/2003 | McNitt | |
| 6,580,451 B2 | 6/2003 | Yonezawa | |
| 6,583,720 B1 | 6/2003 | Quigley | |
| 6,598,090 B2 * | 7/2003 | Champlin | 709/244 |
| 6,606,304 B1 * | 8/2003 | Grinter et al. | 370/252 |
| 6,611,206 B2 * | 8/2003 | Eshelman et al. | 340/573.1 |
| 6,631,271 B1 * | 10/2003 | Logan | 455/41.2 |
| 6,646,675 B1 | 11/2003 | Tang | |
| 6,654,060 B1 | 11/2003 | Kurosawa | |
| 6,686,838 B1 | 2/2004 | Rezvani | |
| 6,697,103 B1 * | 2/2004 | Fernandez et al. | 348/143 |
| 6,697,341 B1 | 2/2004 | Roy | |
| 6,698,021 B1 | 2/2004 | Amini | |
| 6,704,284 B1 * | 3/2004 | Stevenson et al. | 370/241 |
| 6,714,977 B1 * | 3/2004 | Fowler et al. | 709/224 |
| 6,721,391 B2 | 4/2004 | McClelland | |
| 6,738,811 B1 * | 5/2004 | Liang | 709/224 |
| 6,741,171 B2 | 5/2004 | Palka | |
| 6,748,446 B2 | 6/2004 | Sato | |
| 6,754,546 B1 | 6/2004 | Hindus | |
| 6,839,850 B1 * | 1/2005 | Campbell et al. | 726/23 |
| 6,889,264 B2 * | 5/2005 | Clough et al. | 710/15 |
| 6,904,458 B1 * | 6/2005 | Bishop et al. | 709/223 |

| | | | |
|---|---|---|---|
| 6,938,022 B1 | 8/2005 | Singhal | |
| 6,947,988 B1 * | 9/2005 | Saleh | 709/226 |
| 6,954,701 B2 * | 10/2005 | Wolfe | 702/22 |
| 6,954,859 B1 * | 10/2005 | Simerly et al. | 709/232 |
| 6,960,998 B2 * | 11/2005 | Menard et al. | 340/539.19 |
| 6,970,167 B1 * | 11/2005 | Kumamoto et al. | 345/440 |
| 6,970,183 B1 | 11/2005 | Monroe | |
| 7,000,014 B2 * | 2/2006 | Poisson et al. | 709/224 |
| 7,003,670 B2 | 2/2006 | Heaven | |
| 7,013,334 B2 | 3/2006 | Toyoshima | |
| 7,035,332 B2 | 4/2006 | He | |
| 7,039,205 B1 | 5/2006 | Carter | |
| 7,053,767 B2 * | 5/2006 | Petite et al. | 340/531 |
| 7,069,234 B1 * | 6/2006 | Cornelius et al. | 705/26 |
| 7,123,700 B1 | 10/2006 | Weaver, III | |
| 7,124,427 B1 * | 10/2006 | Esbensen | 340/541 |
| 7,190,292 B2 | 3/2007 | Bizjak | |
| 2001/0034754 A1 | 10/2001 | Elwahab | |
| 2002/0019945 A1 | 2/2002 | Houston | |
| 2002/0029263 A1 | 3/2002 | Toyoshima | |
| 2002/0031230 A1 | 3/2002 | Sweet | |
| 2002/0051061 A1 | 5/2002 | Peters | |
| 2002/0087289 A1 | 7/2002 | Halabieh | |
| 2002/0120727 A1 * | 8/2002 | Curley et al. | 709/223 |
| 2002/0138663 A1 | 9/2002 | Ladwig | |
| 2002/0171551 A1 * | 11/2002 | Eshelman et al. | 340/573.1 |
| 2002/0188854 A1 | 12/2002 | Heaven | |
| 2002/0191639 A1 | 12/2002 | Norby | |
| 2002/0198990 A1 | 12/2002 | Bradfield | |
| 2003/0131065 A1 | 7/2003 | Neufeld | |
| 2003/0167153 A1 | 9/2003 | Alexander | |
| 2003/0172138 A1 | 9/2003 | McCormack | |
| 2004/0098623 A1 | 5/2004 | Scheidell | |
| 2004/0132432 A1 | 7/2004 | Moores | |
| 2005/0222820 A1 | 10/2005 | Chung | |
| 2005/0248474 A1 | 11/2005 | Wiser | |
| 2006/0041616 A1 | 2/2006 | Ludwig | |
| 2006/0277299 A1 | 12/2006 | Baekelmans | |
| 2007/0150955 A1 | 6/2007 | Murase | |
| 2007/0226796 A1 | 9/2007 | Gilbert | |
| 2007/0296817 A1 | 12/2007 | Ebrahimi | |
| 2008/0091490 A1 | 4/2008 | Abrahams | |
| 2008/0109879 A1 | 5/2008 | Bhagwat | |

FOREIGN PATENT DOCUMENTS

| WO | WO 97/07486 | 2/1997 |
|---|---|---|
| WO | WO 01/28251 | 4/2001 |

OTHER PUBLICATIONS

"AXIS 200+ Web Camera," Axis Communications brochure NE001/US/R2:15924, 1998, 2 pages.

"AXIS 240 Camera Server," Axis Communications brochure NE002/US/R1:15925, 1998, 2 pages.

"EyeCast Announces EyeCapture Services," EyeCast.com Press Release, Jul. 8, 1998, Sterling, Virginia, <www.eyecast.com/news/releases/070898.asp> [retrieved Sep. 27, 1999], pp. 1-2.

"EyeCast.com Adds 360-Degree Continuous Pan Rotation Cameras to It's [sic] EyeView Service," EyeCast.com Press Release, Mar. 15, 1999, Sterling, Virginia, www.eyecast.com/news/releases/031599.asp [retrieved Sep. 21, 1999], pp. 1-2.

"EyeCast.com Announces EyeView Control," EyeCast.com Press Release, Oct. 12, 1998, Sterling, Virginia, <www.eyecast.com/news/releases/101298.asp> [retrieved Sep. 24, 1999], pp. 1-2.

"EyeCast.com, Inc.: Providing Live Interactive Video for Surveillance & Monitoring Over the Internet," slide presentation, as early as Dec. 26, 2001, 27 pages.

"EyeCast.com Introduces SchoolCast Services for School Safety Officials and Law Enforcement Agencies," EyeCast.com Press Release, Apr. 28, 1999, Sterling, Virginia, <www.eyecast.com/news/releases/090798.asp> [retrieved May 18, 2000], pp. 1-2.

"EyeCast Secures Deals: Security Companies to Use Firm's Off-Site Video Surveillance Technology," Washington Business Journal, Aug. 13-19, 1999, Tech Section, p. 16, <www.eyecast.com/news/washbiz.asp> [retrieved Sep. 21, 1999], 2 pages.

"Network Camera Servers: AXIS 240 Camera Server," Axis Communications, Sep. 23, 1999, <www.axis.se/products/cam_240/> [retrieved Sep. 28, 1999], 2 pages.

"Network Camera Servers: Features & Benefits," Axis Communications, Apr. 17, 1998, <www.axis.se/products/camera_servers/cam_fb.html> [retrieved Sep. 28, 1999], 3 pages.

"Take a Step Into the Future . . . DISS, The Digital Security System," www.remotecams.com, <www.remotecams.com/DISSpage1a.htm;/DISSpage2a.htm;/DISSconfiguration.htm; and/DISSsystem.htm>[retrieved Sep. 17, 1999], 7 pages.

"White Papers: Network Cameras Applications and Solutions," Axis Communications, Apr. 17, 1998, <www.axis.se/products/camera_servers/cam_app_sol.htm> [retrieved Sep. 28, 1999], 8 pages.

* cited by examiner

SYSTEM AND METHOD FOR PROVIDING CONFIGURABLE SECURITY MONITORING UTILIZING AN INTEGRATED INFORMATION SYSTEM

CROSS-REFERENCE TO RELATED APPLICATION

This application claims the benefit of U.S. Provisional Application No. 60/236,282 filed on Sep. 28, 2000, the benefit of which is hereby claimed under U.S.C. § 119. U.S. Provisional Application No. 60/236,282 is incorporated by reference herein.

FIELD OF THE INVENTION

The present invention relates generally to a security monitoring network and, in particular, to a system and method for providing variable, remote monitoring of a locally detected event utilizing an integrated information system.

BACKGROUND OF THE INVENTION

Generally described, electronic security systems are configured to provide a wide range of security services in both residential and commercial settings. The types of monitoring devices utilized by a particular security system to perform the system service depend greatly on the sophistication of the security system configuration and the overall function of the security system. A majority of conventional security systems include intrusion detecting devices, such as door or window contacts, glass break detectors, motion detectors and the like. In a commercial setting, closed-circuit television ("CCTV"), badging systems, asset tracking, and access control devices and sensors are also utilized.

The configuration of the security system is based on the function the system will serve. For example, in one aspect, a typical electronic security system may be used to provide smoke, fire, and/or carbon monoxide detection. Accordingly, the system would utilize one or more smoke, fire and/or carbon monoxide detectors within one or more locations on the premises. In another aspect, the security system may also be utilized to provide motion or access detection as well as general video and audio monitoring of the premises. Accordingly, the system would utilize ingress or egress sensors and/or video cameras within the premises.

While the conventional art generally discloses utilizing multiple monitoring devices to perform various functions, conventional systems are deficient in data management functionality and integration. Security data from different monitoring device types is generally not integrated to affect the system reporting and control. Instead, the conventional security system is built around independent stand-alone devices that require human control and interpretation.

In one security configuration, contract or in-house security guard and patrol services are employed in a range of industrial commercial, public and private settings. The primary functions of the security guard may include direct visual surveillance, the monitoring of security cameras or other security devices, a reception or access control and authorization function, and incident response. A security guard may also be used to monitor a number of CCTV screens arranged in a bank formation. Accordingly, the security guard accepts the variety of inputs and makes a determination of a security alert, such as an unauthorized entrance.

The use of dedicated monitoring services, such as security guards is generally prohibitively expensive and unavailable for a majority of individuals and businesses. Additionally, if the guard is distracted, absent or inattentive, a security event may go unreported. Furthermore, the monitoring device data, such as the CCTV data, is typically available only to the dedicated premises monitor and cannot be utilized concurrently by additional users, such as a remote monitor, a quality control supervisor, the owner of the premises, or emergency or public safety authorities. Moreover, a single security guard may not be capable of processing all of the possible monitoring data sources simultaneously, thereby reducing the effectiveness of multiple monitoring devices.

Another security system configuration utilizes external monitors to provide the security services. Generally described, external monitoring systems are more cost effective than a dedicated on-premises monitor. However, most external monitoring systems have a limited effectiveness in being unable to extensively provide and/or review detailed security information. For example, most conventional external monitoring systems cannot incur the expense of providing a sufficient amount of communication bandwidth to transmit continuous video/audio feeds from every monitored premises. Accordingly, if the external monitoring service detects an unauthorized entry into a premises, such as through a signal from a detecting device, the monitoring service typically dispatches emergency or public safety authorities to investigate and determine the extent of the detected event. In a vast majority of cases, the alarm is false and the premises owner incurs a fine for having the authorities verify the incident. Additionally, in the event of an actual emergency, the monitoring service cannot provide the public safety authorities with sufficient information to assess the situation with monitoring devices, thereby putting the authorities at greater risk.

Similar to the dedicated on-premises monitoring, the remote monitoring service also cannot concurrently process the device information to multiple authorized users for various purposes. For example, a premises owner may need to access video data to locate a pet within the premises, while emergency or public safety personnel would need to access the same video data to identify the location of a victim. In both cases, the monitoring service likely cannot provide the information to the user on a wide scale basis.

Some conventional security system configurations attempt to integrate at least some security monitoring devices to better detect alarm conditions from a remote user. For example, a security system monitor (either remote or on-premises) may detect an unauthorized entry from a motion detector and confirm it by utilizing a video camera. Generally however, these systems are directed towards a combination of video surveillance and are limited into being processed solely for the detection of an intrusion or the verification of an intrusion. These systems generally cannot accept additional non-security information inputs that relate generally to the management of the premises and that are outside of the scope of conventional security monitoring. Moreover, these systems are deficient in that the data cannot be processed concurrently or distributed to multiple authorized users.

In addition to the above-mentioned deficiencies in the conventional art, some monitoring systems, either with a on-premises guard or an external monitor, are further deficient in creating an uncomfortable environment by monitoring (and often recording) on a continuous basis. For example, it may be advantageous to have video access to a public restroom in the event of a medical emergency. However, one skilled in the relevant art will appreciate that the constant monitoring of a public restroom creates an uncomfortable environment for patrons utilizing the facilities during non-emergencies. Additionally, continuous monitoring of areas not prone to have a high rate of emergencies quickly becomes expensive. For example, the constant monitoring of a parking lot during typically off-peak hours presents a great expense to a parking lot provider. Accordingly, many parking lots are left to be monitored by attendants that may have a variety of functions, such as collection, access control, etc.

Thus, there is a need for an integrated information system that can obtain any variety of monitoring device inputs, process any combination of the inputs, and provide customized outputs according to the needs and rights of an authorized user.

SUMMARY OF THE INVENTION

A system and method for implementing an integrated information system are provided. A premises server is in communication with a variety of information sources that produce monitoring data for a premises. The information sources include subsidiary device servers, a variety of individual monitoring devices, as well as other network systems that produce data to be processed. The premises server collects, presents, and transmits monitoring device data to a central server capable of processing data from multiple premises servers. The central server receives the data and traverses one or more logical rule sets to determine whether the inputted data violates the rules. Based on an evaluation of the rules, the central server generates outputs in the form of communication to one or more authorized users via a variety of communication mediums and devices and/or the instigation of a variety of acts corresponding to the evaluation of the rules. Accordingly, the monitoring device data is processed and distributed on multiple levels by the integrated security system.

In one aspect of the present invention, a method for providing an integrated information system in a system having at least one monitoring device is provided. In accordance with the method, an integrated information system obtains monitoring device data from the at least one monitoring device. The integrated information system obtains one or more rules corresponding to the at least one monitoring device. The one or more rules establish a threshold for the monitoring device data. The integrated information system processes the monitoring device data according to the monitoring rules and generates an output corresponding to the processing of the monitoring device data. The output may include no output.

In another aspect of the present invention, a system for implementing an integrated information system is provided. The integrated information system includes one or more monitoring devices operable to transmit monitoring device data and a central processing server operable to obtain the monitoring device data from the one or more monitoring devices. The central processing server processes the monitoring device data according to one or more monitoring device rules and generates an output corresponding to the processing, wherein the output may include no output.

In yet a further aspect of the present invention, a system for implementing an integrated information system is provided. The integrated information system includes one or more monitoring devices operable to transmit monitoring device data and central processing means for obtaining the monitoring device data from the one or more monitoring devices, processing the monitoring device data according to one or more monitoring device rules and generating outputs corresponding to the processing, wherein the outputs may include no output.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
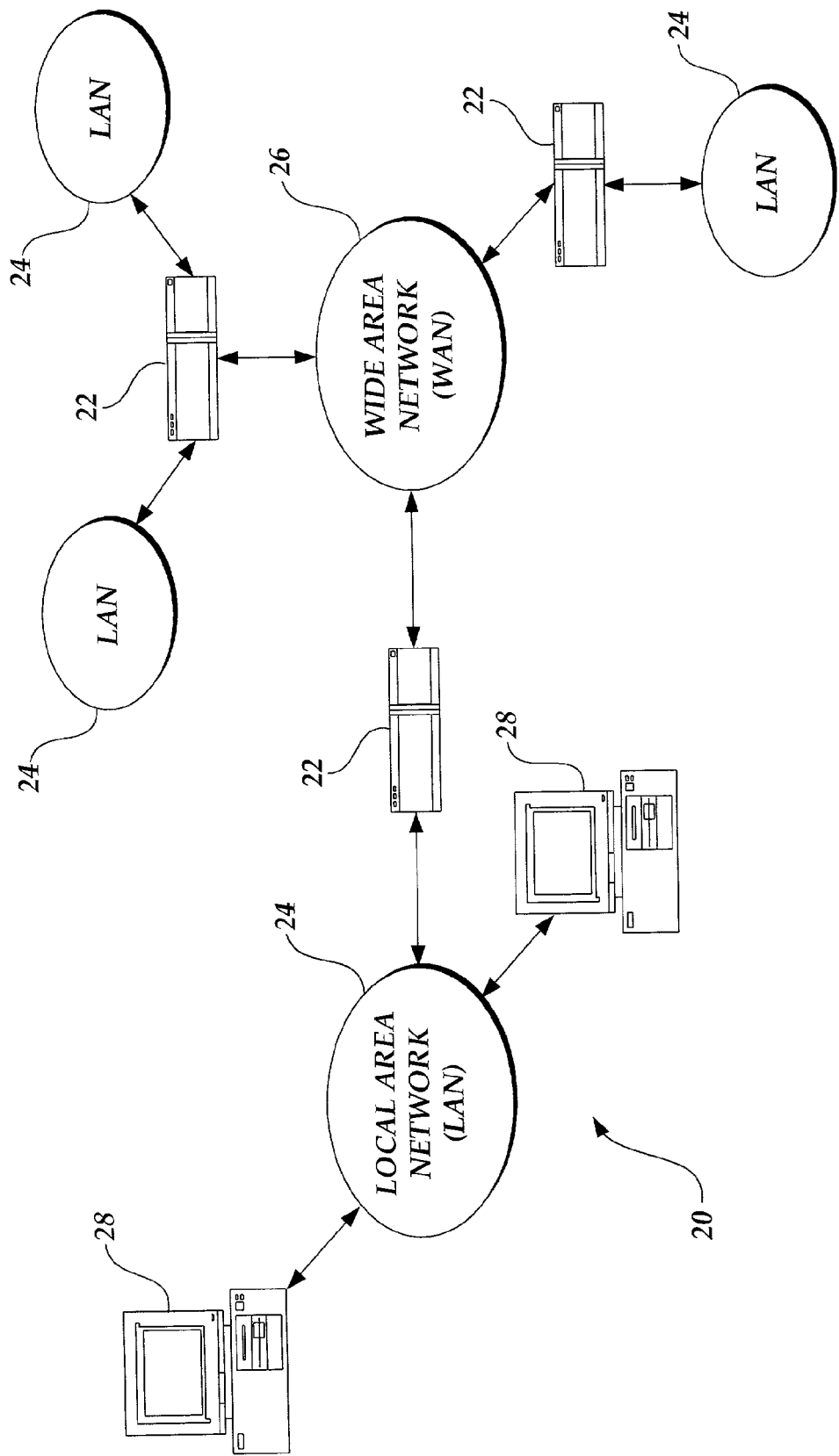
FIG. 1 is a block diagram of an Internet environment.

As described above, aspects of the present invention are embodied in a World Wide Web (the "WWW" or "web") site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, in which a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 1. One skilled in the relevant art will appreciate that aspects of the present invention may be practiced on Internet networks, such as an Intranet.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at "WWW sites" or "Web sites" throughout the Internet. A WWW site is a server connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA® programming language from Sun Microsystems, for execution on a remote computer. Likewise, a WWW server may also include facilities for executing scripts and other application programs on the WWW server itself.

A consumer or other remote consumer may retrieve hypertext documents from the WWW via a WWW browser application program. A WWW browser, such as Netscape's NAVIGATOR® or Microsoft's Internet Explorer, is a software application program for providing a graphical consumer interface to the WWW. Upon request from the consumer via the WWW browser, the WWW browser accesses and retrieves the desired hypertext document from the appropriate WWW server using the URL for the document and a protocol known as HyperText Transfer Protocol ("HTTP"). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA applets, for execution on the client computer.

Figure 2:
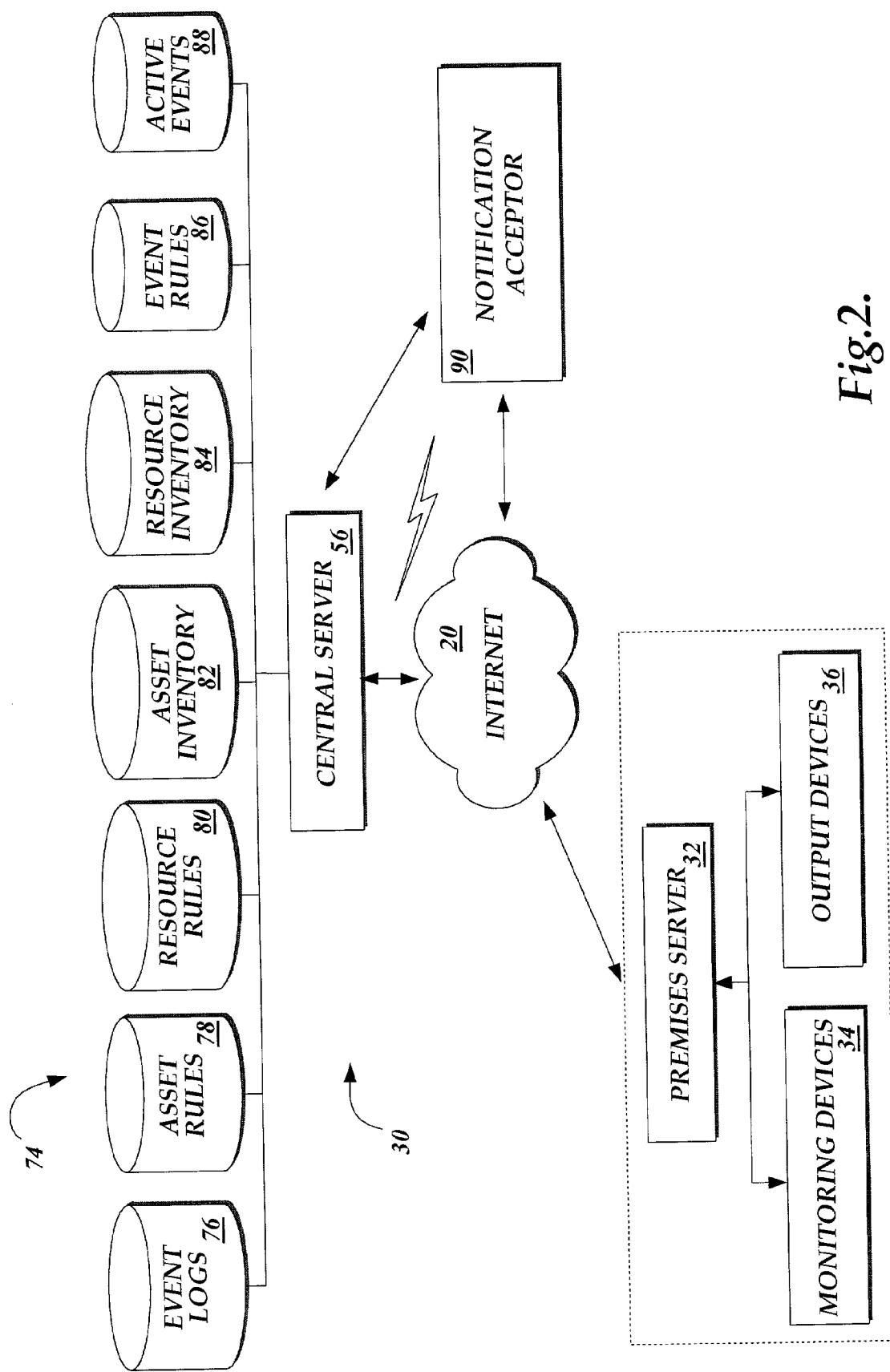
FIG. 2 is a block diagram of an integrated information system in accordance with the present invention.

Referring now to FIG. 2, an actual embodiment of an integrated information system 30 in accordance with the present invention will be described. An integrated information system 30 is a subscriber-based system allowing a number of monitoring devices within one or more premises to be processed at a single control location. Additionally, the data from the monitoring devices is processed according to one or more rules. The control location customizes output of the processed data to a number of authorized users dependent on the preferences and rights of the user. While the system of the present invention is utilized to integrate traditional security monitoring functions, it is also utilized to integrate any information input in a like manner.

With reference to FIG. 2, the integrated information system 30 includes a premises server 32 located on a premises. The premises server 32 communicates with one or more monitoring devices 34. As illustrated in FIG. 2, the premises server 32 communicates with the monitoring devices 34 via a network connection. A more detailed description of a network for communicating with monitoring devices, including the use of one or more device servers, is found in co-pending U.S. Provisional Application No. 60/281,254, entitled SYSTEM AND METHOD FOR MANAGING A DEVICE NETWORK, filed Apr. 3, 2001, the disclosure of which is hereby incorporated by reference.

In an illustrative embodiment, the monitoring devices 34 can include smoke, fire and carbon monoxide detectors. The monitoring devices 34 can also include door and window access detectors, glass break detectors, motion detectors, audio detectors and/or infrared detectors. Still further, the monitoring devices 34 can include computer network monitors, voice identification devices, video cameras, still cameras, microphones and/or fingerprint, facial, retinal, or other biometric identification devices. Still further, the monitoring devices 34 can include conventional panic buttons, global positioning satellite ("GPS") locators, other geographic locators, medical indicators, and vehicle information systems. The monitoring devices 34 can also be integrated with other existing information systems, such as inventory control systems, accounting systems, or the like. It will be apparent to one skilled in the relevant art that additional or alternative monitoring devices 34 may be practiced with the present invention.

The premises server 32 also communicates with one or more output devices 36. In an illustrative embodiment, the output devices 36 can include audio speakers, display or other audio/visual displays. The output devices 36 may also include electrical or electromechanical devices that allow the system to perform actions. The output devices 36 can include computer system interfaces, telephone interfaces, wireless interfaces, door and window locking mechanisms, aerosol sprayers, and the like. As will be readily understood by one skilled in the art, the type of output device is associated primarily with the type of action the information system 30 produces. Accordingly, additional or alternative output devices 36 are considered to be within the scope of the present invention. In accordance with the present invention, the monitoring devices 34 and the output devices 36 can be linked together in a computer network environment in which multiple premises servers 32 work in parallel, sharing data and processes. Moreover, additional premises servers 32, monitoring devices 34, and output devices 36 may be joined modularly to provide extensibility to the system.

Figure 3:
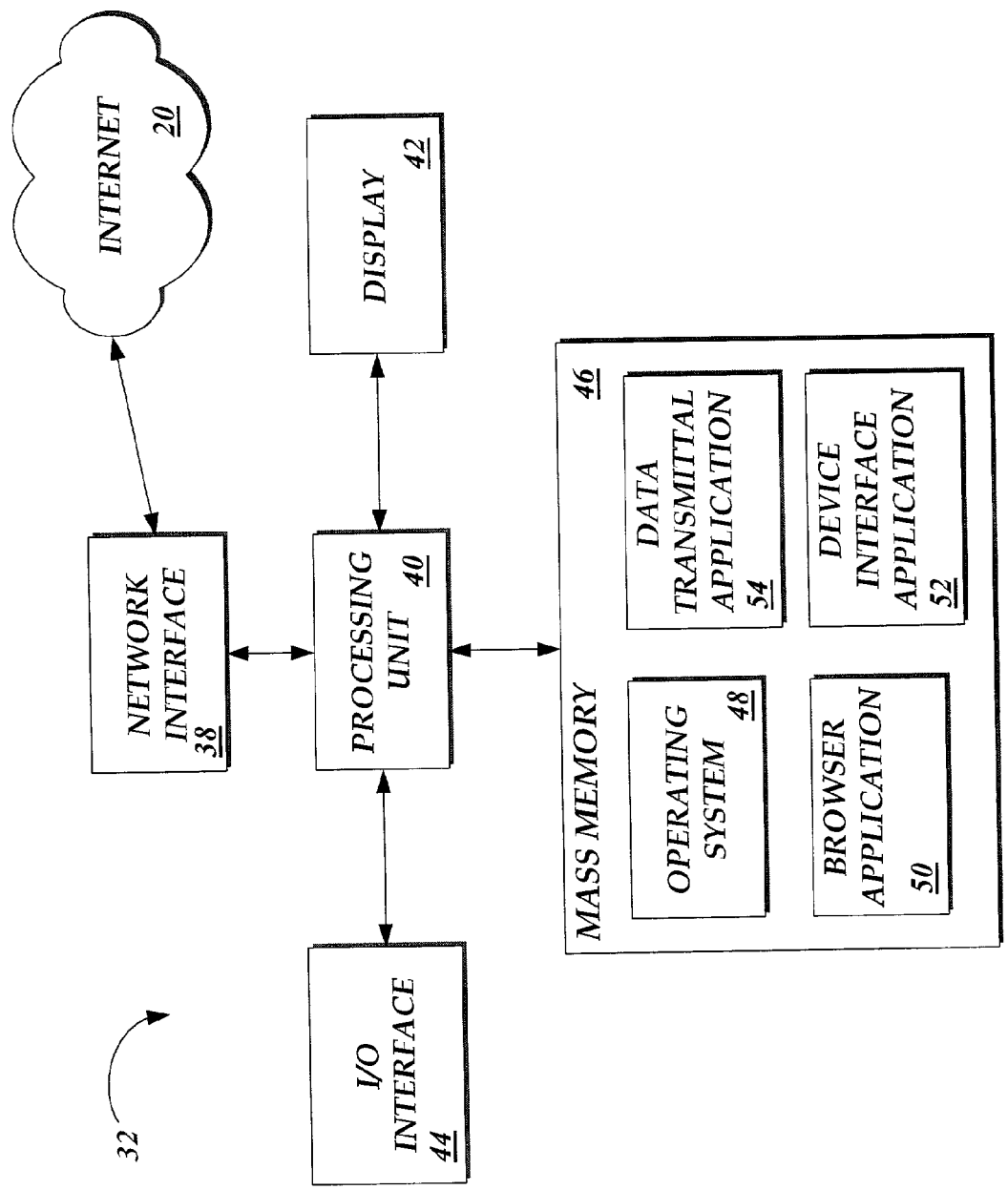
FIG. 3 is a block diagram depicting an illustrative architecture for a premises server in accordance with the present invention.

FIG. 3 is a block diagram depicting an illustrative architecture for a premises server 32. Those of ordinary skill in the art will appreciate that the premises server 32 includes many more components then those shown in FIG. 3. However, it is not necessary that all of these generally conventional components be shown in order to disclose an illustrative embodiment for practicing the present invention. As shown in FIG. 3, the premises server 32 includes a network interface 38 for connecting directly to a LAN or a WAN, or for connecting remotely to a LAN or WAN. Those of ordinary skill in the art will appreciate that the network includes the necessary circuitry for such a connection, and is also constructed for use with the TCP/IP protocol, the particular network configuration of the LAN or WAN it is connecting to, and a particular type of coupling medium. The premises server 32 may also be equipped with a modem for connecting to the Internet through a point to point protocol ("PPP") connection or a serial line Internet protocol ("SLIP") connection as known to those skilled in the art.

The premises server 32 also includes a processing unit 40, a display 42, an input/output (I/O) interface 44 and a mass memory 46, all connected via a communication bus, or other communication device. The I/O interface 44 includes hardware and software components that facilitate interaction with a variety of the monitoring devices via a variety of communication protocols including TCP/IP, X10, digital I/O, RS-232, RS-485 and the like. Additionally, the I/O interface 44 facilitates communication via a variety of communication mediums including telephone land lines, wireless networks (including cellular, digital and radio networks), cable networks and the like. In an actual embodiment of the present invention, the I/O interface is implemented as a layer between the server hardware and software applications utilized to control the individual monitoring devices. It will be understood by one skilled in the relevant art that alternative interface configurations may be practiced with the present invention.

The mass memory 46 generally comprises a RAM, ROM, and a permanent mass storage device, such as a hard disk drive, tape drive, optical drive, floppy disk drive, or combination thereof. The mass memory 46 stores an operating system 48 for controlling the operation of the premises server. It will appreciated that this component may comprises a general-purpose server operating system as is known to those skilled in the art, such as UNIX, LINUX™, or Microsoft WINDOWS NT®. The memory also includes a WWW browser 50, such as Netscape's NAVIGATOR ® or Microsoft's Internet Explorer browsers, for accessing the WWW.

The mass memory 46 also stores program code and data for interfacing with various premises monitoring devices, for processing the monitoring device data and for transmitting the data to a central server. More specifically, the mass memory stores a device interface application 52 in accordance with the present invention for obtaining monitoring device data from a variety of devices and for manipulating the data for processing by the central server. The device interface application 52 comprises computer-executable instructions which, when executed by the premises server 32 obtains and transmits device data as will be explained below in greater detail. The mass memory 46 also stores a data transmittal application program 54 for transmitting the device data to a central server and to facilitate communication between the central server and the monitoring devices 34. The operation of the data transmittal application 54 will be described in greater detail below. It will be appreciated that these components may be stored on a computer-readable medium and loaded into the memory of the premises server using a drive mechanism associated with the computer-readable medium, such as a floppy, CD-ROM, DVD-ROM drive, or network drive.

Figure 4:
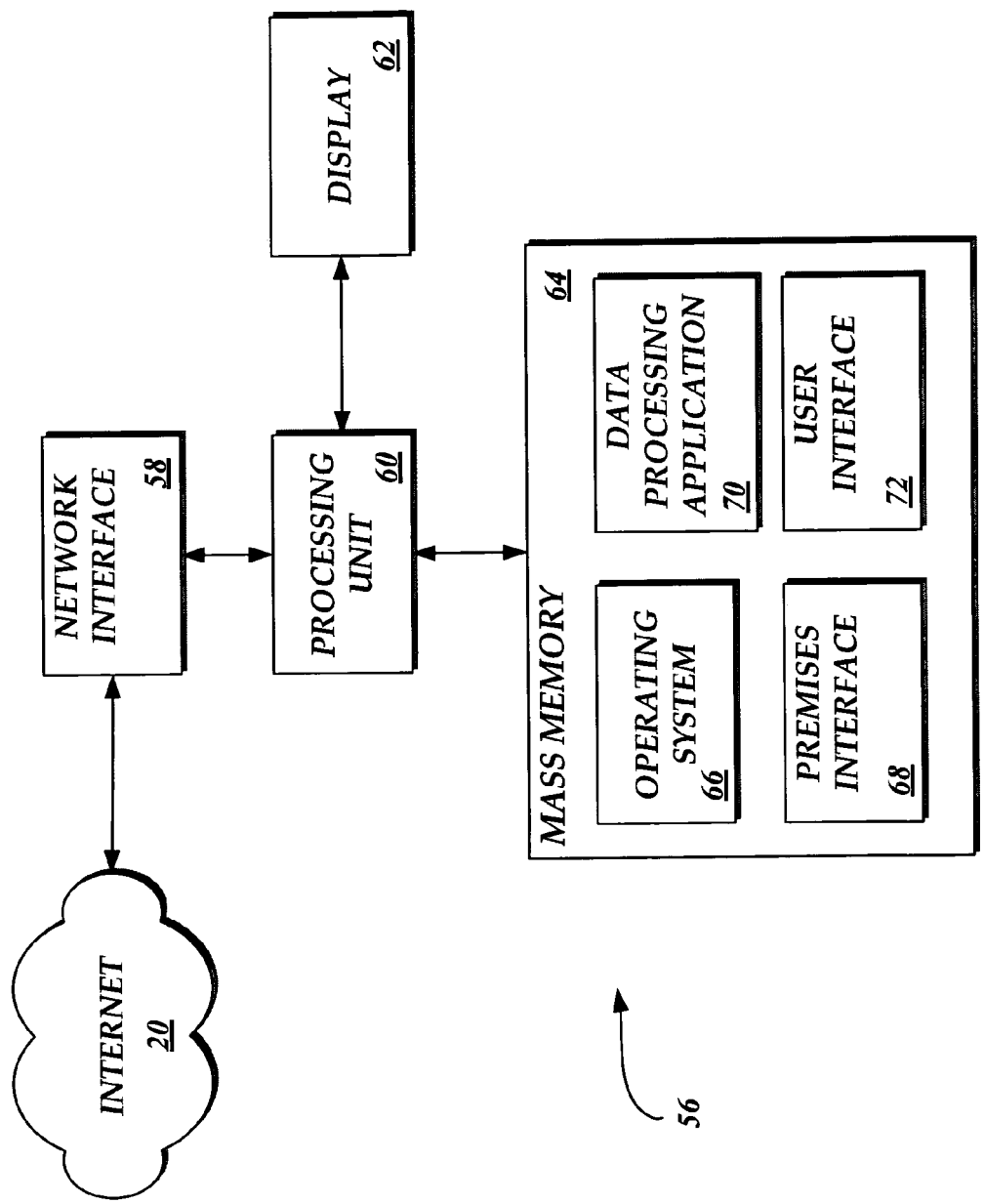
FIG. 4 is a block diagram depicting an illustrative architecture for a central server in accordance with the present invention.

Returning to FIG. 2, the premises server 32 is in communication with a central server 56. Generally described, the central server 56 obtains various monitoring device data, processes the data and outputs the data to one or more authorized users. In an illustrative embodiment, the communication between the central server 56 and the premises server 32 is remote and two-way. FIG. 4 is a block diagram depicting an illustrative architecture for a central server 56. Those of ordinary skill in the art will appreciate that the central server 56 includes many more components then those shown in FIG. 4. However, it is not necessary that all of these generally conventional components be shown in order to disclose an illustrative embodiment for practicing the present invention.

As shown in FIG. 4, the central server 56 includes a network interface 58 for connecting directly to a LAN or a WAN, or for connecting remotely to a LAN or WAN. Those of ordinary skill in the art will appreciate that the network interface includes the necessary circuitry for such a connection, and is also constructed for use with the TCP/IP protocol, the particular network configuration of the LAN or WAN it is connecting to, and a particular type of coupling medium. The central server 56 may also be equipped with a modem for connecting to the Internet 20.

The central server 56 also includes a processing unit 60, a display 62 and a mass memory 64, all connected via a communication bus, or other communication device. The mass memory 64 generally comprises a RAM, ROM, and a permanent mass storage device, such as a hard disk drive, tape drive, optical drive, floppy disk drive, or combination thereof. The mass memory 64 stores an operating system 66 for controlling the operation of the central server. It will appreciated that this component may comprises a general-purpose server operating system.

The mass memory 64 also stores program code and data for interfacing with the premises devices, for processing the device data and for interfacing with various authorized users. More specifically, the mass memory 64 stores a premises interface application 68 in accordance with the present invention for obtaining data from a variety of monitoring devices and for communicating with the premises server. The premises interface application 68 comprises computer-executable instructions which, when executed by the central server 56, interfaces with the premises server 32 as will be explained below in greater detail. The mass memory 64 also stores a data processing application 70 for processing monitoring device data in accordance with rules maintained within the central server. The operation of the data processing application 70 will be described in greater detail below. The mass memory 64 further stores an authorized user interface application 72 for outputting the processed monitoring device data to a variety of authorized users in accordance with the security process of the present invention. The operation of the authorized user interface application 72 will be described in greater detail below. It will be appreciated that these components may be stored on a computer-readable medium and loaded into the memory of the central server using a drive mechanism associated with the computer-readable medium.

It will be understood by one skilled in the relevant art that the premises server 32 may be remote from the premises or may omitted altogether. In such an alternative embodiment, the monitoring devices 34 transmit the monitoring data to a remote premises server 32 or alternatively, they transmit the monitoring data directly to the central server 56.

Also in communication with the central server 56 is a central database 74. In an illustrative embodiment, the central database 74 includes a variety of databases including an event logs database 76, an asset rules database 78, a resource rules database 80, an asset inventory database 82, a resource inventory database 84, an event rules database 86 and an active events database 88. The utilization of the individual databases within the central database 74 will be explained in greater detail below. As will be readily understood by one skilled in the relevant art, the central database 74 may be one or more databases, which may be remote from one another. Additionally, it will be further understood that one or more of the databases 74 may be maintained outside of the central server 56.

With continued reference to FIG. 2, the central server 56 communicates with one or more notification acceptors 90. In an illustrative embodiment, the notification acceptors 90 include one or more authorized users. Each authorized user has a preference of notification means as well as rights to the raw and processed monitoring data. The authorized users include premises owners, security directors or administrators, on-site security guards, technicians, remote monitors (including certified and non-certified monitors), customer service representatives, emergency personnel and others. As will be readily understood by one skilled in the art, various user authorizations may be practiced with the present invention. Additionally, it will be further understood that one or more of the rules databases may be maintained outside of the central server.

In an illustrative embodiment of the present invention, the central server 56 communicates with the notification acceptors 90 utilizing various communication devices and communication mediums. The devices include personal computers, hand-held computing devices, wireless application protocol enabled wireless devices, cellular or digital telephones, digital pagers, and the like. Moreover, the central server 56 may communicate with these devices via the Internet 20 utilizing electronic messaging or Web access, via wireless transmissions utilizing the wireless application protocol, short message services, audio transmission, and the like. As will be readily understood by one skilled in the art, the specific implementation of the communication mediums may require additional or alternative components to be practiced. All are considered to be within the scope of practicing the present invention.

Generally described, the present invention facilitates the collection and processing of a variety of premises information for distribution to one or more authorized users in a highly extensible manner. The system of the present invention obtains monitoring data from any one of a variety of monitoring devices 34. In an actual embodiment of the present invention, the monitoring device data is categorized as asset data, resource data or event data. Asset data is obtained from a monitoring device corresponding to an identifiable object that is not capable of independent action. For example, asset data includes data obtained from a bar code or transponder identifying a particular object, such as a computer, in a particular location. Resource data is obtained from a monitoring device corresponding to an identifiable object that is capable of independent action. For example, resource data includes data from a magnetic card reader that identifies a particular person who has entered the premises. Event data is obtained from a monitoring device corresponding to an on/off state that is not correlated to an identifiable object. Event data is a default category for all of the monitoring devices. As will be readily understood by one skilled in the relevant art, alternative data categorizations are considered to be within the scope of the present invention.

The monitoring device data is obtained by the monitoring devices 34 on the premises server 32 and transmitted to the central server 56. The central server 56 receives the monitoring device data and processes the data according to a rules-based decision support logic. In an actual embodiment of the present invention, the central server 56 maintains databases 74 having logic rules for asset data, resource data and event data. Moreover, because the monitoring device data is potentially applicable to more than one authorized user, multiple rules may be applied to the same monitoring device data. In an alternative embodiment, the rules databases 74 may be maintained in locations remote from the central server 56.

In the event the processing of the monitoring device rules indicates that action is required, the central server 56 generates one or more outputs associated with the rules. The outputs include communication with indicated notification acceptors 90 according to the monitoring device data rules. For example, an authorized user may indicate a hierarchy of communication mediums (such as pager, mobile telephone, land-line telephone) that should be utilized in attempting to contact the user. The rules may also indicate contingency contacts in the event the authorized user cannot be contacted. Additionally, the rules may limit the type and/or amount of data to which the user is allowed to access. Furthermore, the outputs can include the initiation of actions by the central server 56 in response to the processing of the rules.

Figure 5:
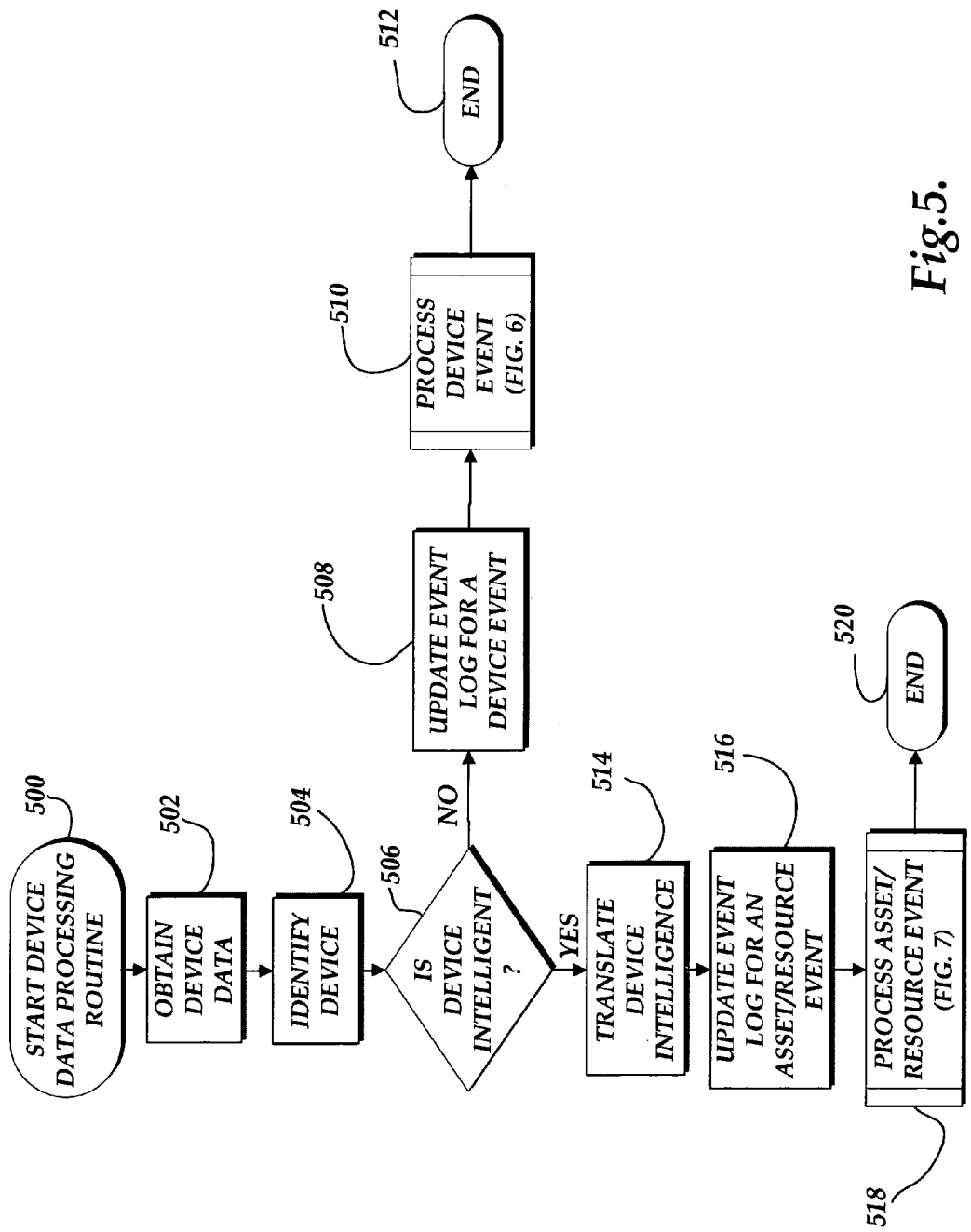
FIG. 5 is a flow diagram illustrative of a monitoring device data processing routine in accordance with the present invention.

FIG. 5 is a flow diagram illustrative of a device decision support process support routine 500 for processing the monitoring device data in accordance with the present invention. At block 502, the central server 56 obtains an input from a monitoring device. In an actual embodiment of the present invention, the input is obtained from the premises server 32. Alternatively, the input may be received directly from the monitoring device 34 or the central server 56 may poll individual devices (or the premises server 32) for an input. At block 504, the central server 56 identifies the device processing the data. The identification may be accomplished by determining a network address from which the input originated and which is assigned to the specific devices, or by reading other identification data that can be included with the data input.

At decision block 506, a test is performed to determine whether the device data includes intelligence data. In an actual embodiment of the present invention, the intelligence data includes data that characterizes the data as asset data or resource data, because the data contains information identifying the object. In contrast, data that does not contain any information identifying an object and is not considered intelligent. If the device is not determined to be intelligent or if the device cannot be identified, at block 508, an event log database 76 is updated to reflect the input data. At block 510, the central server 56 processes the data according to a process device event subroutine. The routine 500 terminates at block 512.

Figure 6:
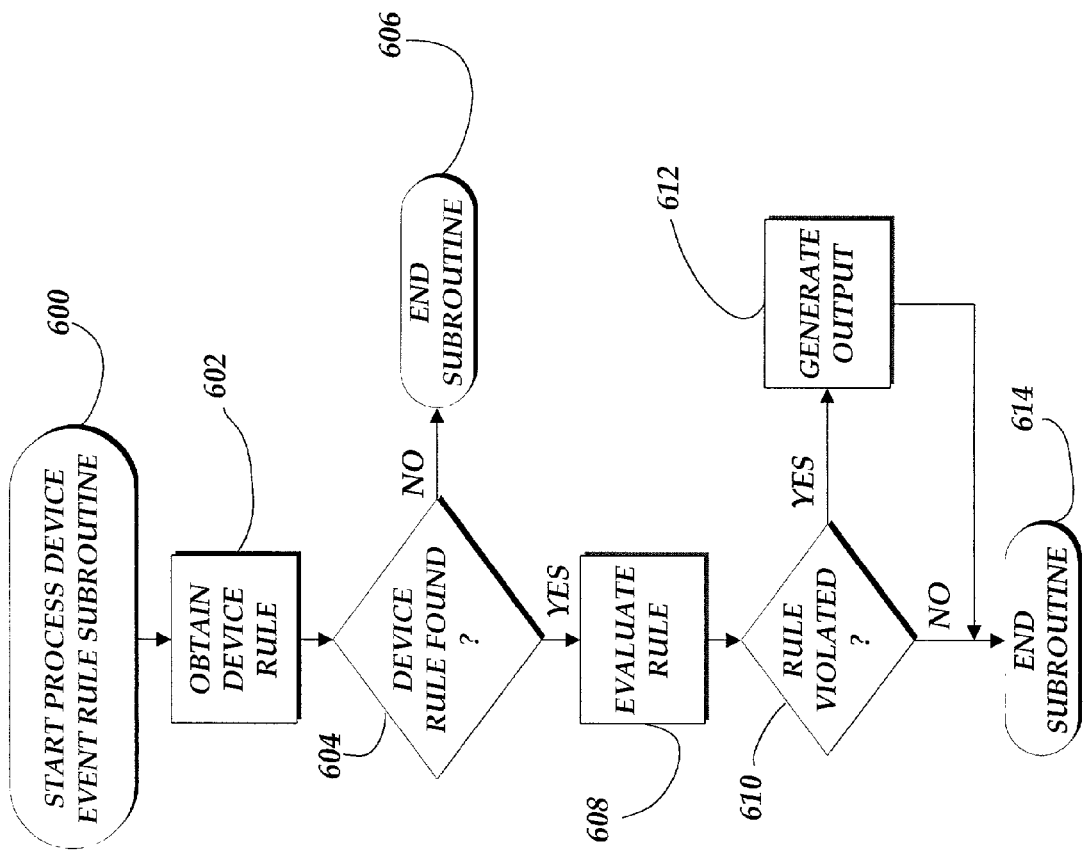
FIG. 6 is a flow diagram illustrative of a device event processing subroutine in accordance with the present invention.

FIG. 6 is a flow diagram illustrative of a process device event subroutine 600 in accordance with the present invention. At block 602, the central server 56 obtains the monitoring device rules. In an actual embodiment, the monitoring device rules are stored in a database 86 in communication with the central server 56. The rules contain data indicating one or more ranges for determining a rule violation. In a broad sense, a rule violation is an indication of an event occurrence for which a notification is required. The ranges correspond to the type of data produced by the monitoring device. For example, if a monitoring device 34 is capable of only two stages (e.g., on or off), the rule may indicate that existence of one stage, e.g. "on", is a violation. The rules may also include an indication that one or more monitoring device rules must also be considered before the rule is determined to be violated. For example, a rule corresponding to a glass break detector may indicate that a motion detector signal must be detected before the rule is violated. As will be readily understood by one skilled in the relevant art, additional or alternative rule types are considered to be within the scope of the present invention.

At decision block 604 a test is performed to determine whether a device rule is found. If no rule is found, the process terminates at block 606. If, however, a device rule is found, at block 608 the central server 56 evaluates the rule according to the data received from the monitoring device 34. In an illustrative embodiment, the rules may include preset or default rules maintained by the central server 56. Additionally, the rules may include independently created rules by one or more authorized users. Moreover, one or more authorized users may be given the authority to modify or update rules via a user interface.

At decision block 610, a test is performed to determine whether the device rule is violated. If the rule is violated, at block 612, the central server 56 creates a rule violation output. In an actual embodiment of the present invention, the rules violation output instructions are included in the rule. The instructions include a list of the authorized users to notify in the event of a rule violation and a hierarchy of which communication medium and devices should be utilized to contact each authorized user. For example, the rules may be in the form of logical if/then statements implementing an iterative hierarchy for establishing communication with an authorized user. Moreover, the instructions may also indicate the extent of the data that that authorized user has access to. For example, the output may include the generation of a call to the premises owner's mobile device, the paging of an on-site monitor and a land-line telephone call to the public authorities. Alternatively, the central server may also maintain an output database indicating the output instructions corresponding to each rule.

In addition to generating communications, the rules violation output may also instigate an integrated system response. For example, in the case of an intrusion, a dye may be sprayed on the intruder from an aerosol sprayer. Additionally, the system may sound an audible alarm and directly dial emergency personnel. In another example, if the system rules violation is a medical emergency, the central server 56 may call an ambulance, turn on lights within the premises, and unlock the doors to facilitate entry by the emergency personnel.

Once the central server 56 has generated the rules violation output at block 612 or if the event rule is not violated at block 610, the subroutine 600 terminates at block 614.

Returning to FIG. 5, if at block 506, the device data includes intelligence information, at block 514, the intelligence is translated from the monitoring device data. At block 516, the log event database 76 is updated to reflect the input data. At block 518, the central server 56 processes the data according to a process asset/resource event subroutine. The routine 500 terminates at block 520.

Figure 7A:
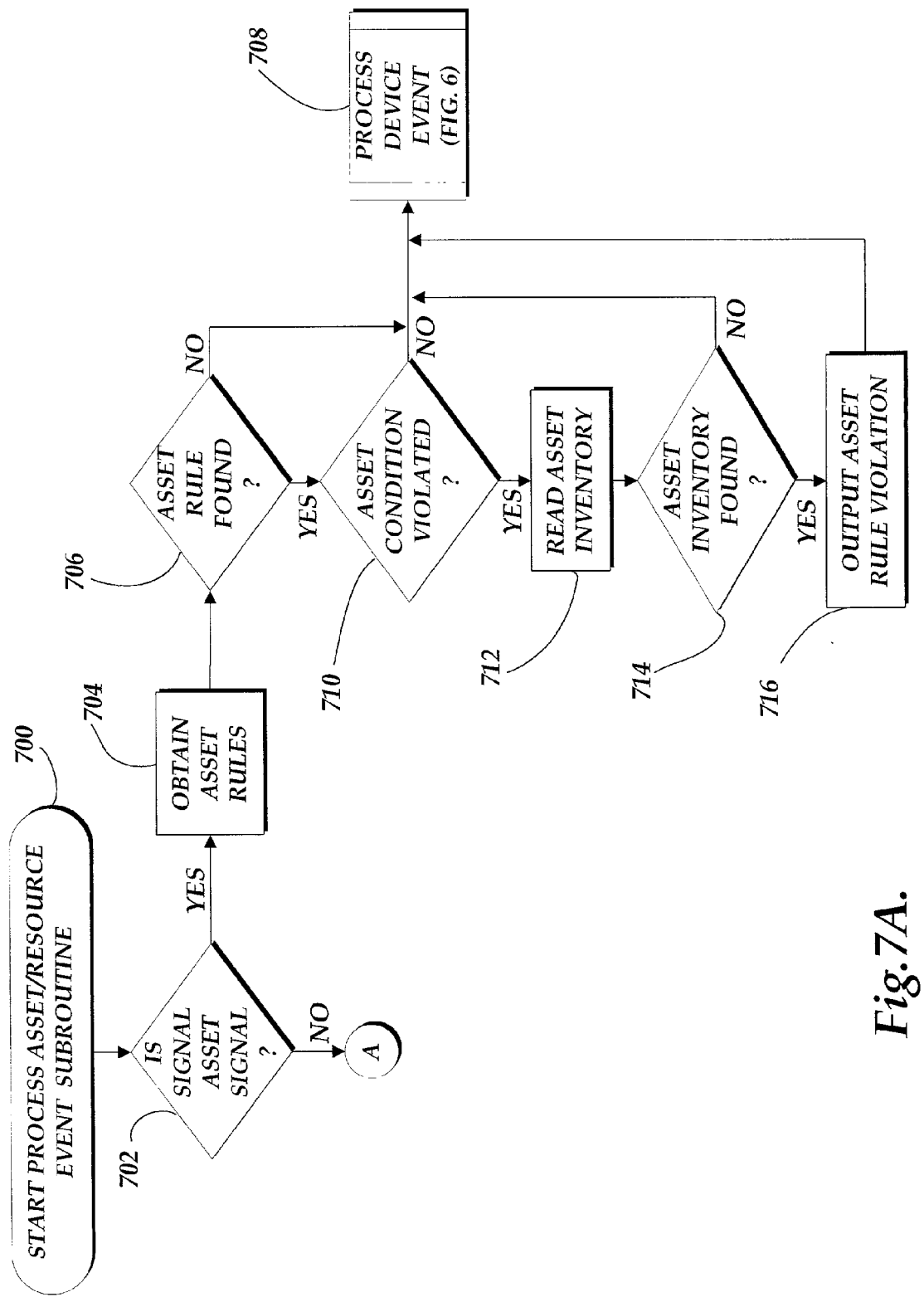
FIGS. 7A and 7B are flow diagrams illustrating an asset/resource event processing subroutine in accordance with the present invention.
Figure 7B:
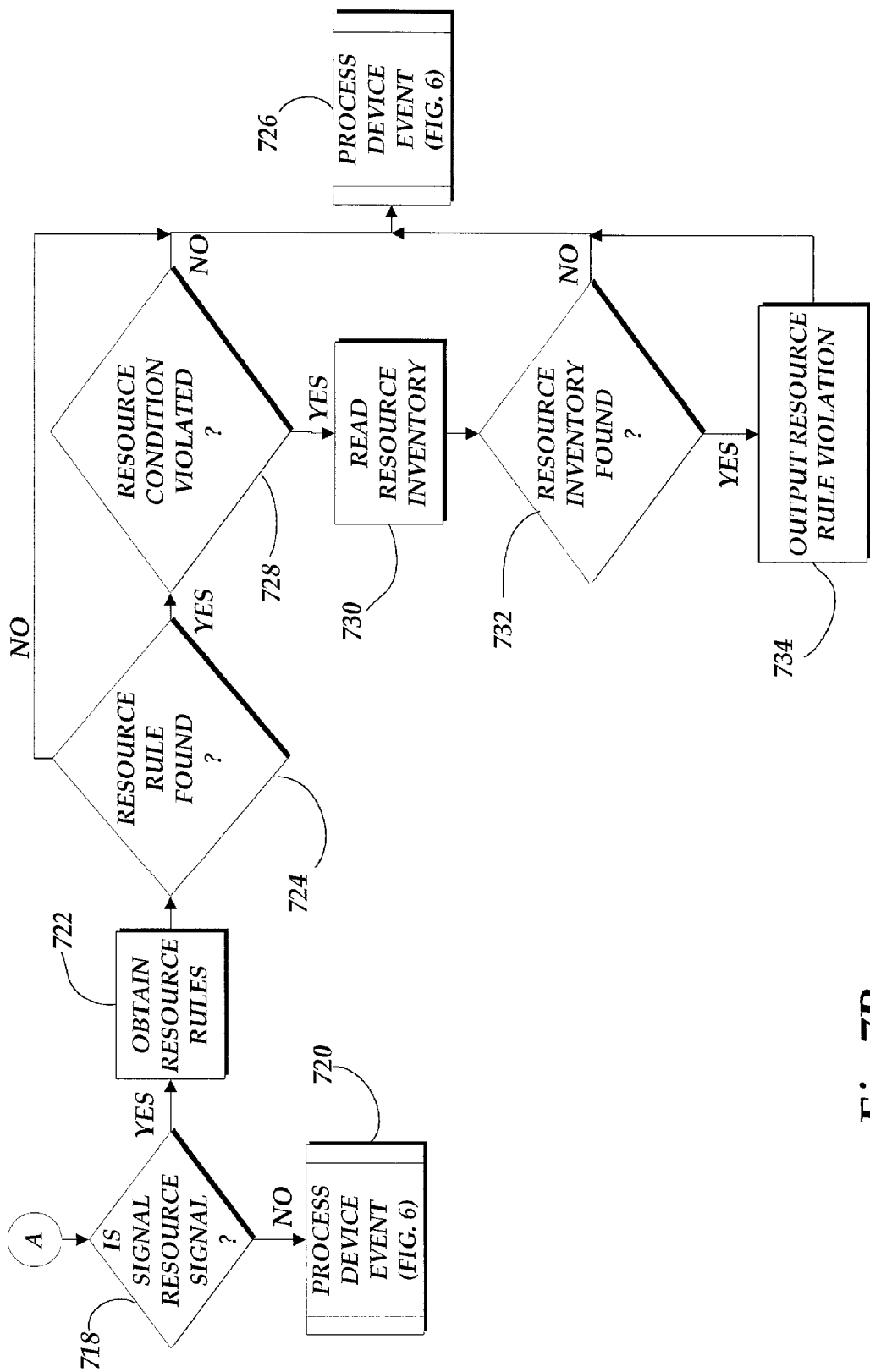

FIGS. 7A and 7B are flow diagrams illustrative of a process asset or resource event subroutine 700 in accordance with the present invention. With reference to FIG. 7A, at decision block 702, a test is performed to determine whether the input signal is asset data. If the signal is identified as asset data, at block 704, the asset rules are obtained. In an actual embodiment of the present invention, the asset rules are maintained and retrieved from an asset rules database 78. At block 706, a test is performed to determine whether an asset rule is found. If no asset rule is found for the asset, the monitoring device data is processed as a device event at block 708. In an actual application of the present invention, the device event is processed as described above with respect to the device event processing subroutine 600 (FIG. 6). In an illustrative embodiment of the present application, in the event the asset rule processing cannot be completed, the monitoring device is still processed as a device-level event.

If an asset rule is found, at decision block 710, a test is performed to determine whether the asset rule is violated. In an actual embodiment of the present invention, the asset rule contains data allowing the central server 56 to determine a rule violation. For example, an asset rule may contain information indicating a requirement of both a particular object (e.g., a computer) performing an action (e.g., logged into a network) for a violation. Additionally, the asset rule may indicate that additional device, resource or asset rules may be considered prior to determining whether the rule has been violated. As explained above, the rules may include preset rules maintained by the central server and user implemented/modified rules.

If the rule has not been violated, the monitoring device data is processed as a device event at block 708. It will be generally understood by one skilled in the relevant art, that processing the rule as a both an asset and a device event allows for multiple purpose processing of the monitoring device data, such as the detection of a specific object and the detection of an object.

If the asset rule has been violated, at block 712, the central server 56 reads a known asset inventory to identify the asset. In an actual embodiment of the present invention, central server maintains and reads from an asset inventory database 82. At decision block 714, a test is performed to determine whether the asset is found in the asset inventory. If the asset is not found, the system defaults to processing the monitoring device data as a device event at block 708. If the asset is found in the asset inventory, at block 716, central server 56 outputs the asset violation. In an actual embodiment of the present invention, the asset rule contains instructions for generating output in the event of a rule violation to one or more authorized users. The instructions also contain a hierarchy of communication mediums and communication devices to attempt to contact the authorized user. Additionally, the instructions may contain alternative contact personnel if central server cannot contact the authorized user. Moreover, as explained above, the output may also instigate action by the integrated system. At block 708, the monitoring device data is processed as a device event.

With reference to FIG. 7B, if the signal is not determined to be asset data at block 702 (FIG. 7A), at decision block 718, a test is done to determine whether the inputted signal is resource data. If the signal is not identified as resource data, at block 720, the monitoring device data is processed as a device event. In an actual application of the present invention, the device event is processed as described above with respect to the device event processing subroutine 600 (FIG. 6). If the signal is identified as resource data, at block 722, the resource rules are obtained. In an actual embodiment of the present invention, the resource rules are maintained and retrieved from a resource rules database 80. At block 724, a test is performed to determine whether a resource rule is found. If no resource rule is found for the resource, the monitoring device data is processed as a device event at block 726.

If a resource rule is found, at decision block 728, a test is performed to determine whether the resource rule is violated. In an actual embodiment of the present invention, the resource rule contains data allowing the central server to determine a rule violation. Additionally, the resource rule may indicate that additional device, resource or asset rules may be considered prior to determining whether the rule has been violated. If the rule has not been violated, at block 726, the monitoring device data is processed as a device event. It will be generally understood by one skilled in the relevant art, that processing the rule as a both a resource and a device event allows for multiple purpose processing of the monitoring device data.

If the resource rule has been violated, at block 730, the central server 56 reads a known resource inventory to identify the resource. In an actual embodiment of the present invention, central server 56 maintains and reads from a resource inventory database 84. At decision block 732, a test is performed to determine whether the resource is found in the resource inventory. If the resource is not found, the system defaults to processing the monitoring device data as a device event at block 726. If the resource is found in the resource inventory, at block 734, central server 56 outputs the resource violation. In an actual embodiment of the present invention, the resource rule contains instructions for generating output in the event of a rule violation to one or more authorized users. The instructions also contain a hierarchy of communication mediums and communication devices to attempt to contact the authorized user. Additionally, the instructions may contain alternative contact personnel if central server 56 cannot contact the authorized user. Moreover, as explained above, the output may also instigate action by the integrated system. At block 726, the monitoring device data is processed as a device event.

Figure 8:
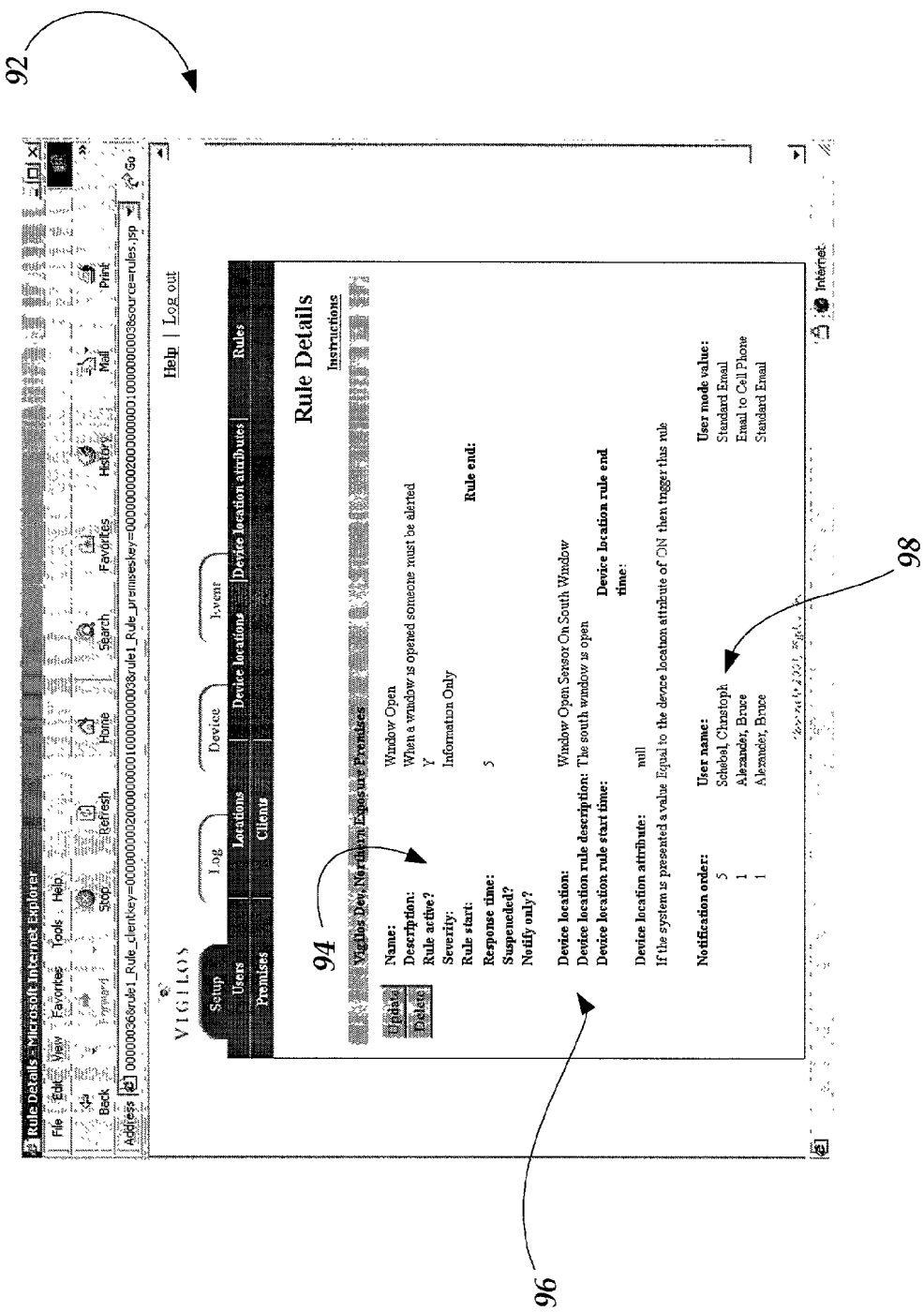
FIG. 8 is illustrative of a screen display produced by a WWW browser enabling a user to review a monitoring device rule in accordance with the present invention.
Figure 9:
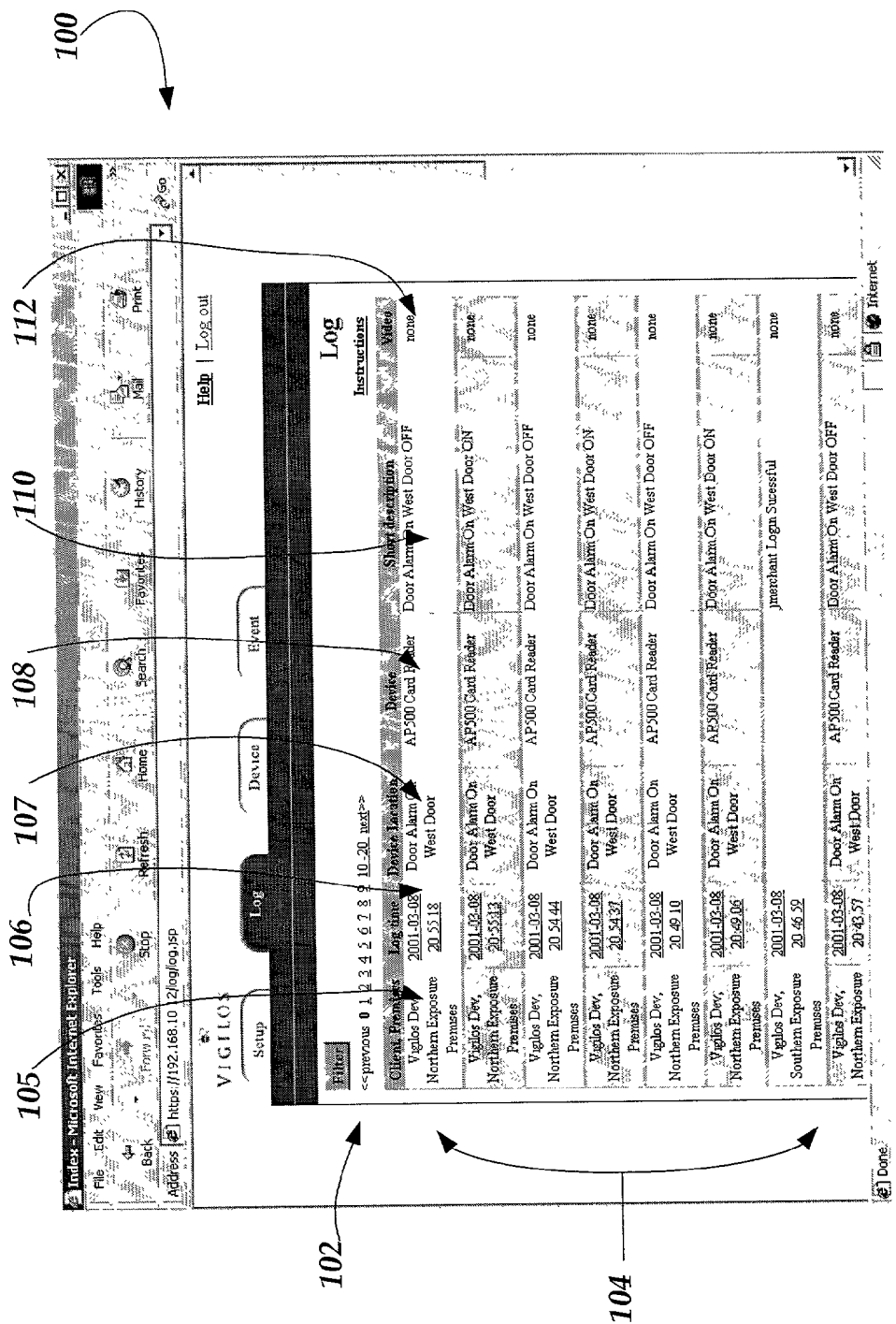
FIG. 9 is illustrative of a screen display produced by a WWW browser enabling a user to review integrated information system data logs in accordance with the present invention.
Figure 10:
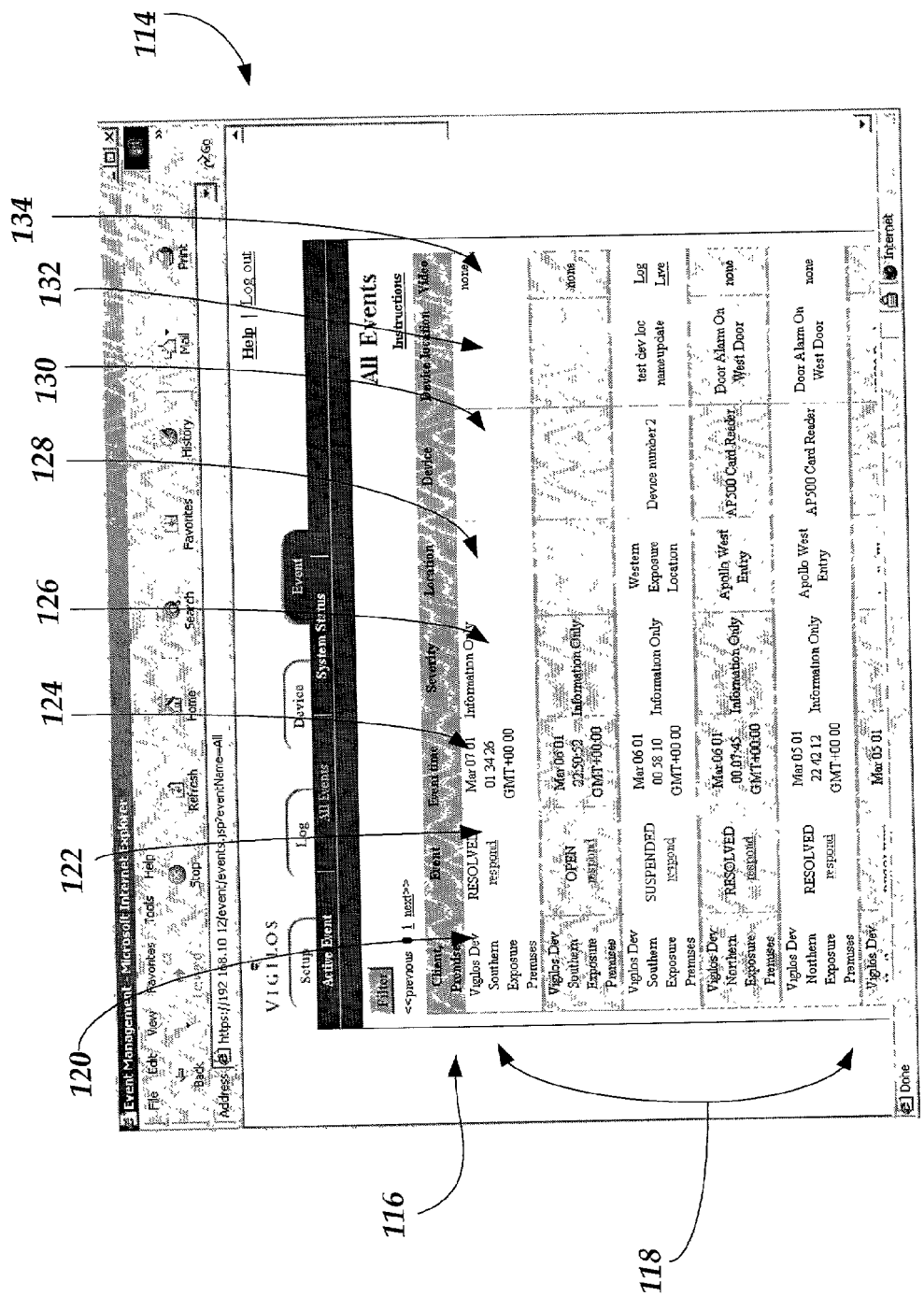
FIG. 10 is an exemplary user interface screen display illustrating a message management interface in accordance with the present invention.

FIGS. 8, 9, and 10 are exemplary screen displays illustrative of various user interfaces relating to various aspects of the integrated information system 10 of the present invention. In an illustrative embodiment of the present invention, the various user interfaces allows an authorized system user to perform a variety of tasks associated with the integrated information system 10 including, but not limited to, installing new monitoring devices 34 or output devices 36, generating or modifying device, asset and resources rules, and/or reviewing collected data. One skilled in the relevant art will appreciate that a variety of user interfaces may be utilized in conjunction with the present invention and that the disclosed embodiments are illustrative and should not be construed as limiting.

In an actual embodiment of the present invention, portions of a user interface with the integrated information system 30 are displayed remotely from one or more of the servers. For example, an authorized user, such as the premises owner, may be available to view an event violation remotely through the use of a standard Internet Web browser based connection. In another embodiment, a remote monitoring service may be given access to control one or more of the monitoring devices 34 via a Web browser based connection or via a direct communication line. Still further, security personnel may review real time monitoring device 34 data via a wireless communication device. Accordingly, the user interface provided to the authorized user may conform to the function being performed, the limits of a device, or the communication medium transmitting the data.

FIG. 8 is illustrative of a screen display 92 produced by a WWW browser enabling a user to review a monitoring device rule in accordance with the present invention. As illustrated in FIG. 8, the screen display 92 includes a field 94 for identifying a name for the rule, one or more fields 96 identifying rule attributes, and one or more fields 98 identifying the notification attributes in the event there is a rule violation. In an actual embodiment of the present invention, an authorized user may review the rule detail, and may also modify or create new rules by completing the associated in the fields.

FIG. 9 is illustrative of a screen display 100 produced by a WWW browser enabling a user to review integrated information system 10 data logs in accordance with the present invention. In an actual embodiment of the present invention, the integrated information system 30 may keep a central log for all event, device and resource violations. As illustrated in FIG. 9, the screen display 100 provides the user with a table 102 of all rules violation data collected by the integrated information system 10. In the illustrative embodiment of the present invention, the table 102 includes a variety of records 104 that include a premises identifier field 105, a time stamp field 106, a device location field 107, a monitoring device 34 identifier field 108, a data descriptor field 110, and an indication 112 of whether the data includes video data. In an actual embodiment of the present invention, an authorized user can filter through the event log by specify searching criteria. Additionally, the authorized user may view more detailed information about specific records 104 by manipulating a peripheral graphical device interface tool, such as a mouse or by using a touchscreen interface. One skilled in the relevant art will appreciate that the event log table 102 may be modified to include additional or less fields.

FIG. 10 is illustrative of a screen display 114 produced by a WWW browser enabling a user to review integrated information system 10 event data logs in accordance with the present invention. In addition to the table 102 of all rules violation, the integrated information system 30 may also maintain specific tables of event rule violations, device rule violations and resource rules violations. The screen display 114 illustrated in FIG. 10 includes a table 116 of all event rules violation data. The table 116 is defined by a variety of records 118 that are defined by a client premises location field 120, an event status field 122, a time stamp field 124, an event severity field 126, an event location field 128, a device identifier field 130, a device location field 132 and a video data present field 134. Similar to the screen display 100, in an actual embodiment of the present invention, an authorized user is able to filter event data and also obtain greater detail. One skilled in the relevant art will appreciate that various screen display formats may be utilized with the present invention.

In an illustrative embodiment of the present invention, the method and system of the present invention are implemented in the form of a computer network monitor. It will be understood by one skilled in the relevant art that the disclosed illustrative embodiment is done by way of example and that the present invention is not limited to its application as a computer network monitor. In accordance with the illustrative embodiment, the premises server is connected to a computer network monitor associated with a premises computer network. The computer network monitor serves as a resource data detector by identifying one or more specific users who are logged onto the computer network. Additionally, the computer network monitor serves as an asset data detector by identifying one or more specific network components, such as mass memory storage or servers, on the computer network. Finally, the computer network monitor serves as a event data detector by identifying how many users are logged into the network or that a user is logged onto the network.

In accordance with this embodiment, a computer network monitoring device collects information regarding the identity of users logged into the network. The monitor may also collect information regarding network usage, or inactivity. The central server obtains the network monitor data and obtains a resource rule corresponding to an identified resource. In the illustrative embodiment, the central server the resource rule may dictate whether the user is authorized to log into the network from a particular computer or whether the user is allowed to log into the computer network at certain times. For example, a rule may indicate a user may not be allowed to log into the network from a computer outside of the premises. Similarly, the rule may indicate that the user may not log into the network after 8:00 p.m. Moreover, the resource rule (reflective of the fact that the user is on vacation) may indicate that the user is not be logged in to the network at all.

In the event that the resource rule is violated, the central server contacts the authorized users, such as a computer system administrator, listed in the resource rule and may also disconnect the user. The central server may also instigate action, such as logging the user off the network automatically.

The computer system monitor data may also be processed as an asset data event. In this capacity, if one of the network components is in need of maintenance (e.g., disk full or server down), the central server indicates a rules violation and generates an appropriate output. Another asset rule application may include detecting when a specific component is used (thereby creating a rules violation) for tracking system utilization.

The computer system monitor data may also be processed as a device event indicating that another user is logged into the network. In this capacity, a device event rule within the central server may indicate a rule violation if more than twenty users are logged in at the same time. Accordingly, irrespective of whether the resource rule is violated, an event rule may also be violated by the same action. Thus, the security system processes the data according to several rules and issues notifications according to each rule.

In another illustrative embodiment of the present invention, the method and system of the present invention are implemented in the form of a premises access control system. It will be understood by one skilled in the relevant art that the disclosed illustrative embodiment is done by way of example and that the present invention is not limited to its application as a premises access detection system. In accordance with the illustrative embodiment, the premises server is connected to one or more presence indicators, such as a magnetic identification card reader, video camera, and microphone. The premises access monitor serves as a resource data detector by identifying one or more persons who enter the premises. Additionally, the premises access monitor serves as a event data detector by identifying that one or more persons are present, irrespective of the identity of the person.

In one aspect, the central server obtains the monitoring device data and obtains a resource rule corresponding to an identified resource. In the illustrative embodiment, the resource rule may dictate whether the user is authorized to enter specific areas of the premises or whether the user is authorized to be in a specific area at a certain time of day. For example, a resource rule may state that the particular user may not be allowed to enter the computer room without a computer administrator, whose presence is determined by another resource rule, also being in the room. The user may also not be allowed to enter a file room after 8:00 p.m.

In another aspect of this illustrative embodiment, the monitoring device data may include an audible signal, such as a call for "help." Utilizing voice recognition software, the system can process the words to initiate an action according to the rules. For example, the system may be trained to respond to all persons who state an "emergency" word, such as "help." Additionally, the system may respond to authorized users, whose voice print can be identified, allowing the user additional control or access to the system.

In addition to being processed as a resource rule, the computer system monitor data may also be processed as a device event indicating that a person, regardless of the identity on the premises. In this capacity, a device event rule within the central server may indicate a rule violation if anyone is in a certain area. Accordingly, irrespective of whether the resource rule is violated, an event rule may also be violated by the same action.

In the event that either a resource rule and/or event rule is violated, the central server contacts the authorized users, such as a security monitor to indicate an unauthorized person on the premises. The device processing server may also instigate action, such as sounding an audible alarm or locking secured areas of the premises. In one aspect of this illustrative embodiment, the premises server may instigate a two-way conversation with a person on the premises, or create a three-way telephone call. In another aspect of this illustrative embodiment, the rule violation may instigate the recording of the monitoring device data. Accordingly, an authorized user, such as the premises owner, has the opportunity to view the data, through a Web browser. The authorized user can utilize the data to confirm a security event or for informative purposes.

In another alternative application of this illustrative embodiment, an authorized system user needs to contact someone currently on the premises. Accordingly, the system would poll the premises server to obtain the identity of the persons on the premises. The authorized user would request information regarding the presence of particular people or anyone in general. The system could also identify a closest communication device associated with the person on the premises to contact the particular person. Moreover, in the event public safety personnel are contacted and are given limited authority to the system, the system may output the identity and location of the unauthorized person on the premises to the authorities via a mobile device or a video display.

In another aspect of the present invention, the transmission of the monitoring device data and output data is facilitated through standard communication mediums, such as the Internet. However, the use of standard communication channels creates a need for data security and integrity. For example, in the case of conventional video transmission over the Internet, such as streaming, loss of video data is common and utilized to reduce data size. As will be generally understood by one skilled in the relevant art, however, the loss of video frame data for detecting a security event is generally unacceptable.

The present invention overcomes the deficiencies by implementing a packet encrypted data transmission method. In accordance with this aspect of the present invention, the premises server packages the monitoring device data into smaller sized data packets. Each data packet is compressed, encrypted and sent to the device processing server over the Internet. The central server obtains the packet and decrypts the data. The data is processed and an acknowledge signal is sent to the premises server. The premises server then is ready to send the next packet. If the data cannot be processed or appears to be compromised, the central server will not acknowledge the packet. Accordingly, the premises server will either try to resend the packet or fail the transmission. As will be readily understood by one skilled in the art, the method is also utilized to transmit data from the central server to the premises server or to a notification acceptor.

The encrypted packet transmission method of the present invention allows the security network to utilize standard communication channels, while mitigating the security risks associated with those channels. Moreover, the method further mitigates the loss of data in transmitting the data through the security network.

The present invention facilitates the integration of a variety of monitoring devices such that monitored data may be processed by a system applying multiple rules. By evaluating the monitored data by one or more rules having different outputs, the same monitoring data may be utilized by different authorized users, having different access rights, for different purposes. This also allows the system to be customized for different privacy regulations.

In yet another aspect of the present invention, the integrated information system 10 is implemented to provide support to an unlimited number of devices in a single distributed data network. In this embodiment, the multiple premises server computers 32, monitoring devices 34, and output devices 36 are linked together in a computer network and associated into a single logical connector. Accordingly, the processing of the monitoring device data may be distributed over any number of premises servers 32. Additionally, a distributed network environment provides a modularity to system. The modularity allows for expansion and/or reconfiguration of the integrated information.

Other examples of potential uses of the system of the present invention include, but are not limited to, integration with an electronic inventory system to process a low inventory event. Additionally, the system maybe integrated with many household appliances to allow a service call to be made when the appliance needs repair. The system may also allow for integrating security monitoring devices to allow a guard to "patrol" the premises by concurrently utilizing multiple devices, such as access detectors, cameras and microphones. As will be readily understood, numerous additional uses may also be practiced with the present invention.

While an illustrative embodiment of the invention has been illustrated and described, it will be appreciated that various changes can be made therein without departing from the spirit and scope of the invention.

The embodiments of the invention in which an exclusive property or privilege is claimed are defined as follows:

1. In an integrated information system including a central server in communication with premises servers that are associated with two or more geographically distinct sites, a method for processing monitoring device data, the method comprising:
    obtaining monitoring device data at the premises servers that are associated with the two or more geographically distinct sites, wherein the monitoring device data corresponds to two monitoring devices with at least one monitoring device at each geographically distinct site wherein the monitoring device data is obtained continuously;
    at the premises servers, characterizing the monitoring device data as at least one of asset data, resource data, and event data;
    transmitting the monitoring device data and characterization data from the premises servers to the central server;
    obtaining one or more monitoring rules at the central server corresponding to the at least one monitoring device, wherein the one or more rules establish the thresholds of monitoring device data that define a rule violation and wherein obtaining one or more rules includes at least one of:
        obtaining asset rules if the monitoring device data is characterized as asset data;
        obtaining resource rules if the monitoring device data is characterized as resource data; and
        obtaining device rules if the monitoring device data is characterized as event data;
    processing the monitoring device data at the central server according to the monitoring rules to determine whether a rule violation occurred wherein a rule violation identifies a combination of thresholds for each of the two monitoring devices;
    wherein processing the monitoring device data according to the rules includes determining whether the monitoring device data exceeds thresholds of security information indicative of whether an unauthorized access to a premises has occurred; and
    generating an output corresponding to the processing of the monitoring device data, wherein the output indicates whether a rule violation occurred;
    characterizing the monitoring device data as asset data, resource data or event data;
    wherein asset data includes data from an identifiable object that is not capable of independent action;
    wherein resource data includes data from an object capable of independent action; and
    wherein event data includes data from a device having a defined state.

2. The method of claim 1, wherein the monitoring device data is characterized as asset data and device data.

3. The method of claim 1, wherein the monitoring device data is characterized as resource data and device data.

4. The method of claim 1, wherein the device rules establish a state threshold for a rule violation, and wherein processing the monitoring device data according to the device rules includes determining whether the monitoring device data indicates a particular state.

5. The method of claim 4, wherein the monitoring device data is motion detection data and wherein the device rule threshold is the detection of motion.

6. The method of claim 1, wherein characterizing the monitoring device data comprises determining whether the monitoring device data includes data identifying a monitoring device generating the data.

7. The method of claim 6, wherein characterizing the monitoring device data as asset data further includes comparing the data identifying the monitoring device generating the monitoring device data to a set of known assets.

8. The method of claim 7, wherein the set of known assets are maintained in a database.

9. The method of claim 6, wherein characterizing the monitoring device data as resource data further includes comparing the data identifying the monitoring device generating the monitoring device data to a set of known resources.

10. The method of claim 9, wherein the set of known resources are maintained in a database.

11. The method of claim 1, wherein generating an output corresponding to the processing of the monitoring device data includes generating a communication to one or more designated users, wherein generating the communication includes identifying a hierarchy that prioritizes the communication to the one or more designated users.

12. The method of claim 11, wherein generating an output to one or more designated users includes:
    obtaining a schedule of preferred notification methods; and
    selecting a notification method from the schedule of notification methods.

13. The method of claim 12, wherein the schedule of preferred notification methods includes an indication of one or more preferred communication methods based on a time of day.

14. The method of claim 12, wherein each designated user is associated with a schedule of preferred notification methods.

15. The method of claim 11, wherein generating a communication to one or more designated users includes generating a wireless communication to a designated user.

16. The method of claim 1, wherein generating an output corresponding to the processing of the monitoring device data includes initiating an action at a geographically distinct site where the monitoring data was obtained.

17. The method of claim 16, wherein the action includes activating a physical device within a monitored premises.

18. The method of claim 17, wherein the physical device generates a an output in a tangible medium.

19. The method of claim 17, wherein the physical device is an audible alarm.

20. The method of claim 17, wherein the physical device is a microphone and speaker assembly.

21. The method of claim 1, wherein generating an output corresponding to the processing of the monitoring device data includes processing one or more additional monitoring device rules prior to generating an output.

22. The method of claim 1, wherein the at least one monitoring device includes a network access monitor and wherein the monitoring device includes data identifying one or more users logged into a computer network.

23. The method of claim 1, wherein the at least one monitoring device includes a movement sensor and wherein the monitoring device data includes data identifying whether an individual has passed through a monitored area.

24. The method of claim 23, wherein the monitoring device data further includes data identifying a particular individual passing through the monitored data.

25. The method of claim 1, wherein the at least one monitoring device includes a number of monitoring devices and wherein the monitoring device data includes data identifying the location of individuals within a premises.

26. The method of claim 25, wherein the monitoring device data further identifies the identities of individuals within the premises.

27. The method of claim 26, wherein generating an output corresponding to the processing of the monitoring device data includes generating an output dedicated to a particular individual identified within the premises.

28. The method of claim 1, wherein obtaining monitoring device data from at least one monitoring device includes obtaining the monitoring device data from a distributed communication network.

29. A computer readable medium having computer-executable instructions for performing the method recited in claim 1.

30. A computer system having a processor, a memory and an operating environment, the computer system operable to perform the method recited in claim 1.

31. A system for implementing an integrated information system, the system comprising:
one or more monitoring devices corresponding to two or more geographically distinct sites organized according to geographic criteria and operable to continuously transmit monitoring device data;
one or more premises servers operable to obtain the monitoring device data from the one or more monitoring devices, characterize the monitoring device data as at least one of asset data, resource data, and event data, transmit the monitoring device data and characterization data to the central processing server;
a central processing server, the central processing server operable to continuously obtain the monitoring device data originating from at least one monitoring device at each of the two or more geographically distinct sites;
wherein the central processing server processes the monitoring device data according to one or more monitoring device rules corresponding to the one or more monitoring devices organized according to geographic criteria, wherein the central processing server generates an output corresponding to the processing, wherein the output reflects the results of processing the monitoring device data according to the rules;
wherein the processing of monitoring device data performed by the central processing server includes determining whether the monitoring device data exceeds thresholds of security information indicative of whether an unauthorized access to a premises has occurred; and
wherein the processing of monitoring device data performed by the central processing server includes at least one of:
obtaining asset rules if the monitoring device data is characterized as asset data that is from an identifiable object incapable of independent action;
obtaining resource rules if the monitoring device data is characterized as resource data from an object capable of independent action;
obtaining device rules if the monitoring device data is characterized as event data from a device having a defined state; and
wherein the monitoring device rules identify a combination of thresholds for the monitoring device data that define a rule violation.

32. The system as recited in claim 31 further comprising at least one premises server in communication with at least one of the monitoring devices and with the central processing server, wherein the premises server is operable to obtain the monitoring device data from the monitoring device and to transmit the monitoring device data to the central processing server.

33. The system as recited in claim 32, wherein the at least one premises server includes two or more premises servers connected in parallel to each other.

34. The system as recited in claim 31, further comprising one or more rules databases for maintaining the monitoring device rules.

35. The system as recited in claim 34, wherein the one or more rules databases include an event rules database for maintaining monitoring device rules corresponding to event data.

36. The system as recited in claim 34, wherein the one or more rules databases include an asset rules database for maintaining monitoring device rules corresponding to asset data.

37. The system as recited in claim 34, wherein the one or more rules databases include a resource rules database for maintaining monitoring device rules corresponding to resource data.

38. The system as recited in claim 31 further comprising one or more output devices in communication with the central processing server, wherein the output devices are operable to obtain an output from the central processing server.

39. The system as recited in claim 38, wherein the output devices include an audible alarm.

40. The system as recited in claim 38, wherein the output devices include a speaker and microphone assembly.

41. The system as recited in claim 31, wherein one or more of the monitoring devices communicate with the central processing server via a data network.

42. The system as recited in claim 41, wherein the data network is the Internet.

43. The system as recited in claim 41, wherein the data network is a distributed data network.

44. A system for implementing an integrated information system, the system comprising:
one or more monitoring devices corresponding to two or more geographically distinct sites organized according to geographic criteria and operable to continuously transmit monitoring device data;
one or more premises means operable to obtain the monitoring device data from the one or more monitoring devices, characterize the monitoring device data as at least one of asset data, resource data, and event data, transmit the monitoring device data and characterization data to the central processing means;
a central processing means, the central processing means operable to continuously obtain the monitoring device data originating from at least one monitoring device at each of the two or more geographically distinct sites;
wherein the central processing means processes the monitoring device data according to one or more monitoring device rules corresponding to the one or more monitoring devices organized according to geographic criteria, wherein the central processing means generates an output corresponding to the processing, wherein the output reflects the results of processing the monitoring device data according to the rules;
wherein the processing of monitoring device data performed by the central processing means includes determining whether the monitoring device data exceeds thresholds of security information indicative of whether an unauthorized access to a premises has occurred; and wherein the processing of monitoring device data performed by the central processing means includes at least one of:
  obtaining asset rules if the monitoring device data is characterized as asset data that is from an identifiable object incapable of independent action;
  obtaining resource rules if the monitoring device data is characterized as resource data from an object capable of independent action;
  obtaining device rules if the monitoring device data is characterized as event data from a device having a defined state; and
wherein the monitoring device rules identify a combination of thresholds for the monitoring device data that define a rule violation.

45. The system as recited in claim 44 further comprising data communication means in communication with at least one monitoring device and with the central processing means, wherein the data communication means obtains monitoring device data from the monitoring device and transmits the data to the central processing means.

46. The system as recited in claim 45, wherein the communications means include parallel processing means obtaining and for data transmitting.

47. The system as recited in claim 44, further comprising means for maintaining the monitoring device rules.

48. The system as recited in claim 47, wherein the means for maintaining the monitoring device rules include means for maintaining monitoring device rules corresponding to event data.

49. The system as recited in claim 47, wherein the means for maintaining the monitoring device rules include means for maintaining monitoring device rules corresponding to asset data.

50. The system as recited in claim 47, wherein the means for maintaining the monitoring device rules include means for maintaining monitoring device rules corresponding to resource data.

51. The system as recited in claim 44 further comprising one or more output device means for obtaining outputs from the central processing means.

52. The system as recited in claim 44, wherein one or more of the monitoring devices communicate with the central processing means via data network means.

53. The system as recited in claim 52, wherein the data network means include a distributed data network means.

* * * * *

UNITED STATES PATENT AND TRADEMARK OFFICE
CERTIFICATE OF CORRECTION

PATENT NO. : 7,627,665 B2 Page 1 of 1
APPLICATION NO. : 09/825506
DATED : December 1, 2009
INVENTOR(S) : Barker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 695 days.

Signed and Sealed this

Second Day of November, 2010

David J. Kappos
*Director of the United States Patent and Trademark Office*